(12) United States Patent
Depraete

(10) Patent No.: US 9,541,181 B2
(45) Date of Patent: Jan. 10, 2017

(54) TORQUE CONVERTER AND HYDROKINETIC TORQUE COUPLING DEVICE HAVING TURBINE-PISTON LOCKUP CLUTCH WITH FLOW RESTRICTOR, AND RELATED METHODS

(71) Applicant: VALEO EMBRAYAGES, Amiens (FR)

(72) Inventor: Alexandre Depraete, Bloomfield, MI (US)

(73) Assignee: Valeo Embrayages (FR)

( * ) Notice: Subject to any disclaimer, the term of this patent is extended or adjusted under 35 U.S.C. 154(b) by 72 days.

(21) Appl. No.: 14/522,393

(22) Filed: Oct. 23, 2014

(65) Prior Publication Data
US 2016/0116042 A1    Apr. 28, 2016

(51) Int. Cl.
F16H 45/02    (2006.01)
F16H 45/00    (2006.01)

(52) U.S. Cl.
CPC ......... F16H 45/02 (2013.01); *F16H 2045/007* (2013.01); *F16H 2045/0205* (2013.01); *F16H 2045/0226* (2013.01); *F16H 2045/0278* (2013.01)

(58) Field of Classification Search
CPC .............. F16H 45/02; F16H 2045/0205; F16H 2045/0273; F16H 2045/0278
See application file for complete search history.

(56) References Cited

U.S. PATENT DOCUMENTS

| | | | | |
|---|---|---|---|---|
| 2,130,895 | A | * 9/1938 | Ness | F16D 47/06 |
| | | | | 192/3.26 |
| 2,860,747 | A | 11/1958 | Kelley | |
| 2,992,713 | A | * 7/1961 | Stump | F16H 61/14 |
| | | | | 192/3.33 |
| 3,041,892 | A | 7/1962 | Schjolin | |
| 3,126,079 | A | * 3/1964 | Howard | F16H 45/02 |
| | | | | 192/3.33 |
| 3,252,352 | A | 5/1966 | General et al. | |
| 4,041,701 | A | 8/1977 | Goto et al. | |

(Continued)

FOREIGN PATENT DOCUMENTS

| | | |
|---|---|---|
| DE | 1550957 A1 | 7/1969 |
| DE | 2245901 A1 | 4/1974 |

(Continued)

OTHER PUBLICATIONS

U.S. Appl. No. 14/510,244, filed Oct. 9, 2014, First Named Inventor: Alexandre Depraete.

(Continued)

*Primary Examiner* — Jacob S Scott
(74) *Attorney, Agent, or Firm* — Berenato & White, LLC

(57) ABSTRACT

A torque converter features an impeller including an impeller shell and impeller blades, a turbine-piston including a turbine-piston shell and turbine blades, and a restrictor. The turbine-piston shell is axially displaceable relative to the impeller shell to position the torque converter (or a hydrokinetic torque coupling device containing the torque converter) into and out of lockup mode. The restrictor positioned radially outward of the impeller blades and the turbine blades at an opening of a fluid passage connecting the torus chamber to an environment outside the torque converter.

21 Claims, 23 Drawing Sheets

(56) References Cited

U.S. PATENT DOCUMENTS

| | | | |
|---|---|---|---|
| 4,153,147 A * | 5/1979 | Chana | F16H 45/02 192/3.28 |
| 5,713,442 A | 2/1998 | Murata et al. | |
| 5,813,505 A | 9/1998 | Olsen et al. | |
| 6,026,940 A | 2/2000 | Sudau | |
| 6,915,886 B2 | 7/2005 | Dacho et al. | |
| 7,191,879 B2 | 3/2007 | Arhab et al. | |
| 7,445,099 B2 | 11/2008 | Maucher et al. | |
| 8,276,723 B2 | 10/2012 | Verhoog et al. | |
| 2003/0168298 A1 | 9/2003 | Holler et al. | |
| 2003/0168299 A1 | 9/2003 | Holler et al. | |
| 2004/0011032 A1 | 1/2004 | Holler et al. | |
| 2006/0086584 A1 | 4/2006 | Maucher et al. | |
| 2013/0230385 A1 | 9/2013 | Lindemann et al. | |
| 2014/0014454 A1 | 1/2014 | Davis | |
| 2014/0014455 A1 | 1/2014 | Davis | |
| 2014/0097055 A1 | 4/2014 | Lindemann et al. | |
| 2014/0110207 A1 | 4/2014 | Davis | |
| 2015/0152951 A1 * | 6/2015 | Rentfrow | F16H 45/02 192/3.29 |
| 2015/0362041 A1 | 12/2015 | Lee et al. | |

FOREIGN PATENT DOCUMENTS

| | | |
|---|---|---|
| DE | 10226860 A1 | 12/2003 |
| EP | 0125428 A1 | 11/1984 |
| EP | 1744074 | 1/2007 |
| FR | 668839 A | 11/1929 |
| FR | 2317556 A1 | 2/1977 |
| FR | 2428188 A1 | 1/1980 |
| FR | 2561342 A1 | 9/1985 |
| FR | 2736982 A1 | 1/1997 |
| FR | 2787854 A1 | 6/2000 |
| GB | 598811 | 2/1948 |
| JP | 58-131466 A | 8/1983 |
| KR | 101311531 B1 | 9/2013 |
| WO | WO2004018897 | 3/2004 |
| WO | 2004046574 A1 | 6/2004 |

OTHER PUBLICATIONS

U.S. Appl. No. 14/510,267, filed Oct. 9, 2014, First Named Inventor: Alexandre Depraete.

U.S. Appl. No. 14/522,189, filed Oct. 23, 2014, First Named Inventor: Alexandre Depraete.

U.S. Appl. No. 14/522,263, filed Oct. 23, 2014, First Named Inventor: Alexandre Depraete.

U.S. Appl. No. 14/522,302, filed Oct. 23, 2014, First Named Inventor: Alexandre Depraete.

U.S. Appl. No. 14/522,333, filed Oct. 23, 2014, First Named Inventor: Alexandre Depraete.

U.S. Appl. No. 14/522,361, filed Oct. 23, 2014, First Named Inventor: David Werthman.

U.S. Appl. No. 14/522,372, filed Oct. 23, 2014, First Named Inventor: Alexandre Depraete.

U.S. Appl. No. 14/561,961, filed Dec. 5, 2014, First Named Inventor: Alexandre Depraete.

U.S. Appl. No. 14/562,022, filed Dec. 5, 2014, First Named Inventor: Alexandre Depraete.

U.S. Appl. No. 14/562,064, filed Dec. 5, 2014, First Named Inventor: Alexandre Depraete.

U.S. Appl. No. 14/562,099, filed Dec. 5, 2014, First Named Inventor: Alexandre Depraete.

U.S. Appl. No. 14/562,136, filed Dec. 5, 2014, First Named Inventor: Alexandre Depraete.

U.S. Appl. No. 14/562,216, filed Dec. 5, 2014, First Named Inventor: Sungchul Lee.

U.S. Appl. No. 14/562,253, filed Dec. 5, 2014, First Named Inventor: Alexandre Depraete.

U.S. Appl. No. 14/562,286, filed Dec. 5, 2014, First Named Inventor: Alexandre Depraete.

U.S. Appl. No. 14/687,602, filed Apr. 15, 2015, First Named Inventor: Alexandre Depraete.

Lindemann et al., "iTC—Innovative Solutions for Torque Converters Pave the Way into the Future", Torque Converter 20, pp. 280-301.

* cited by examiner

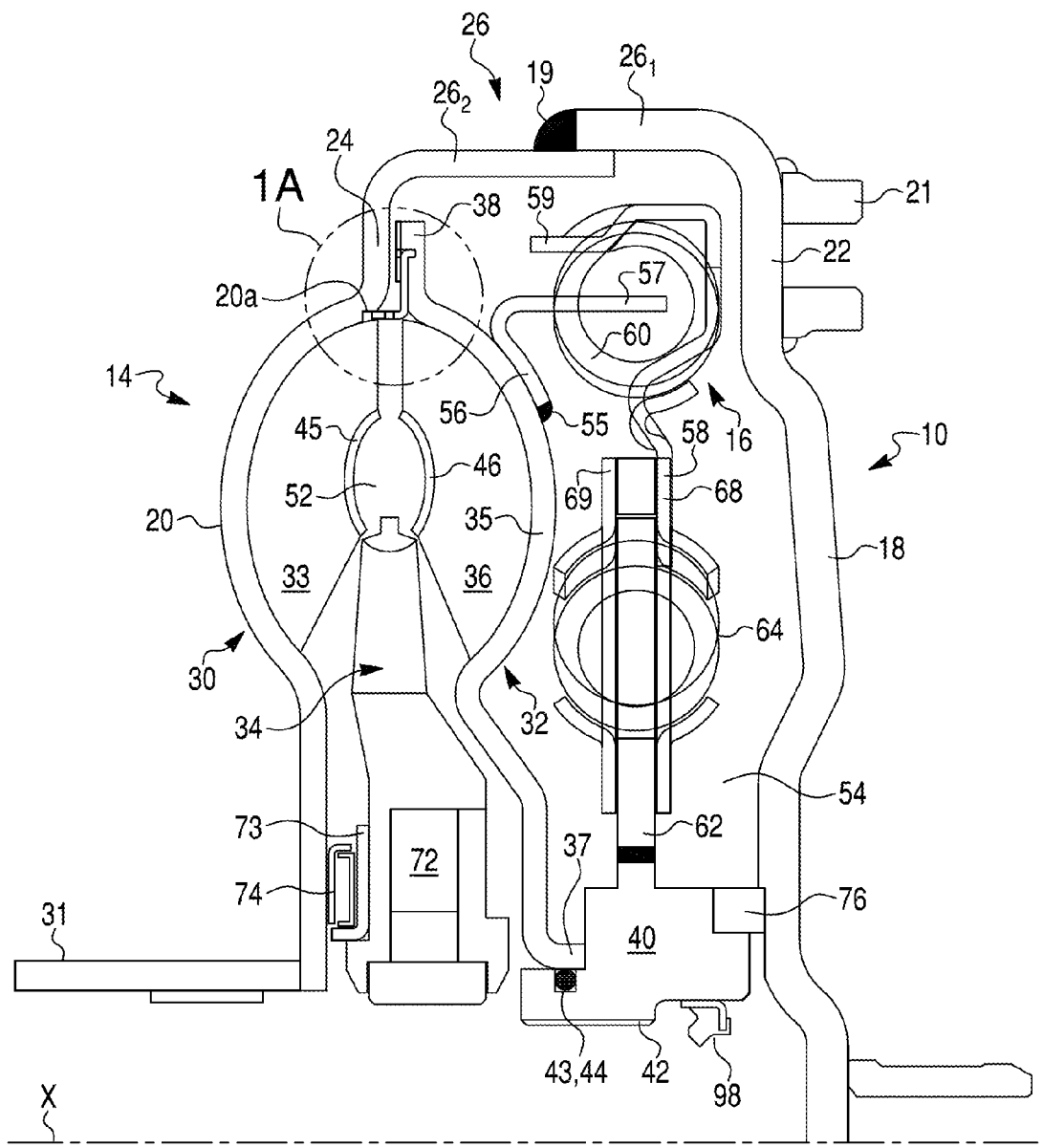

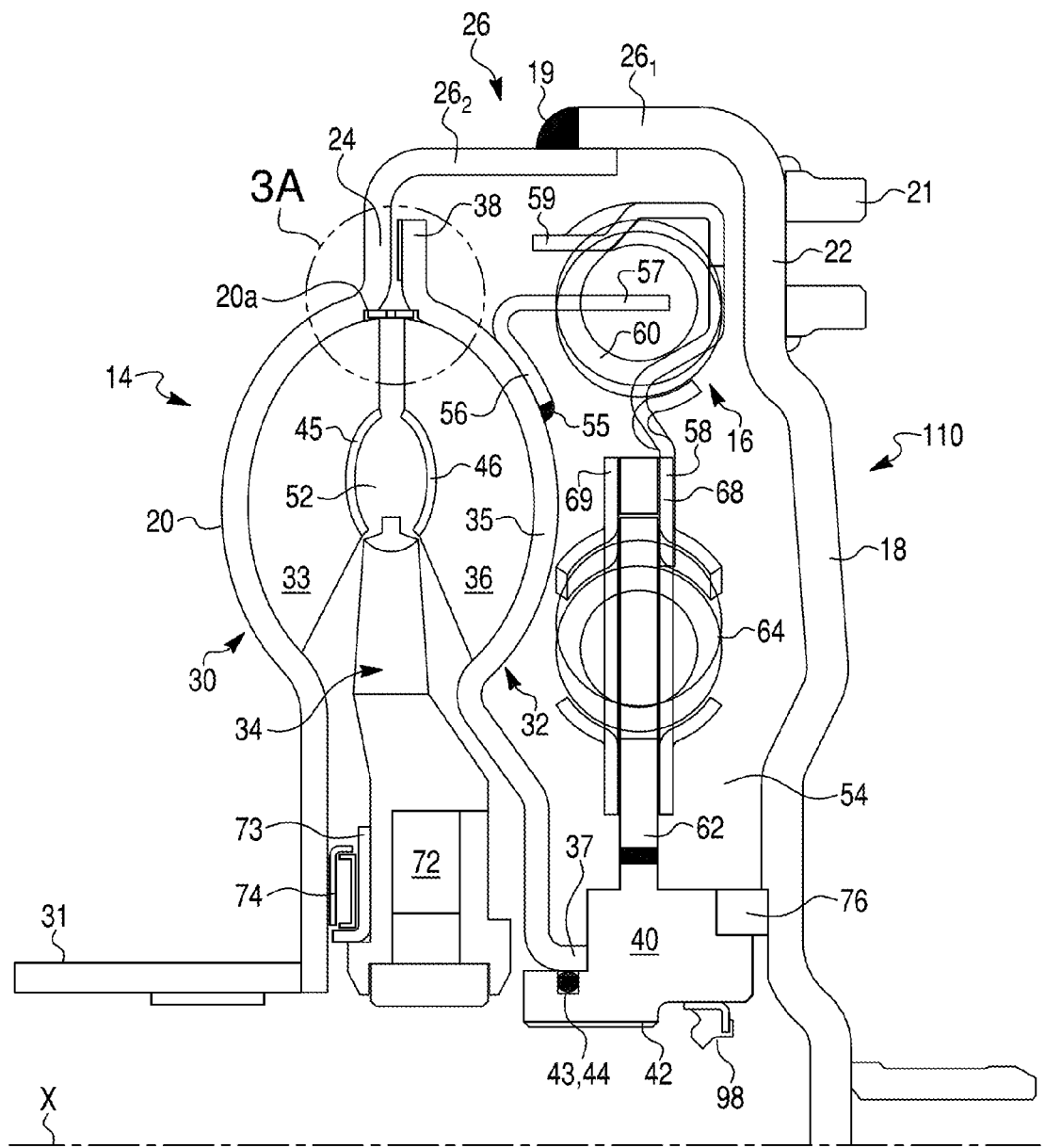

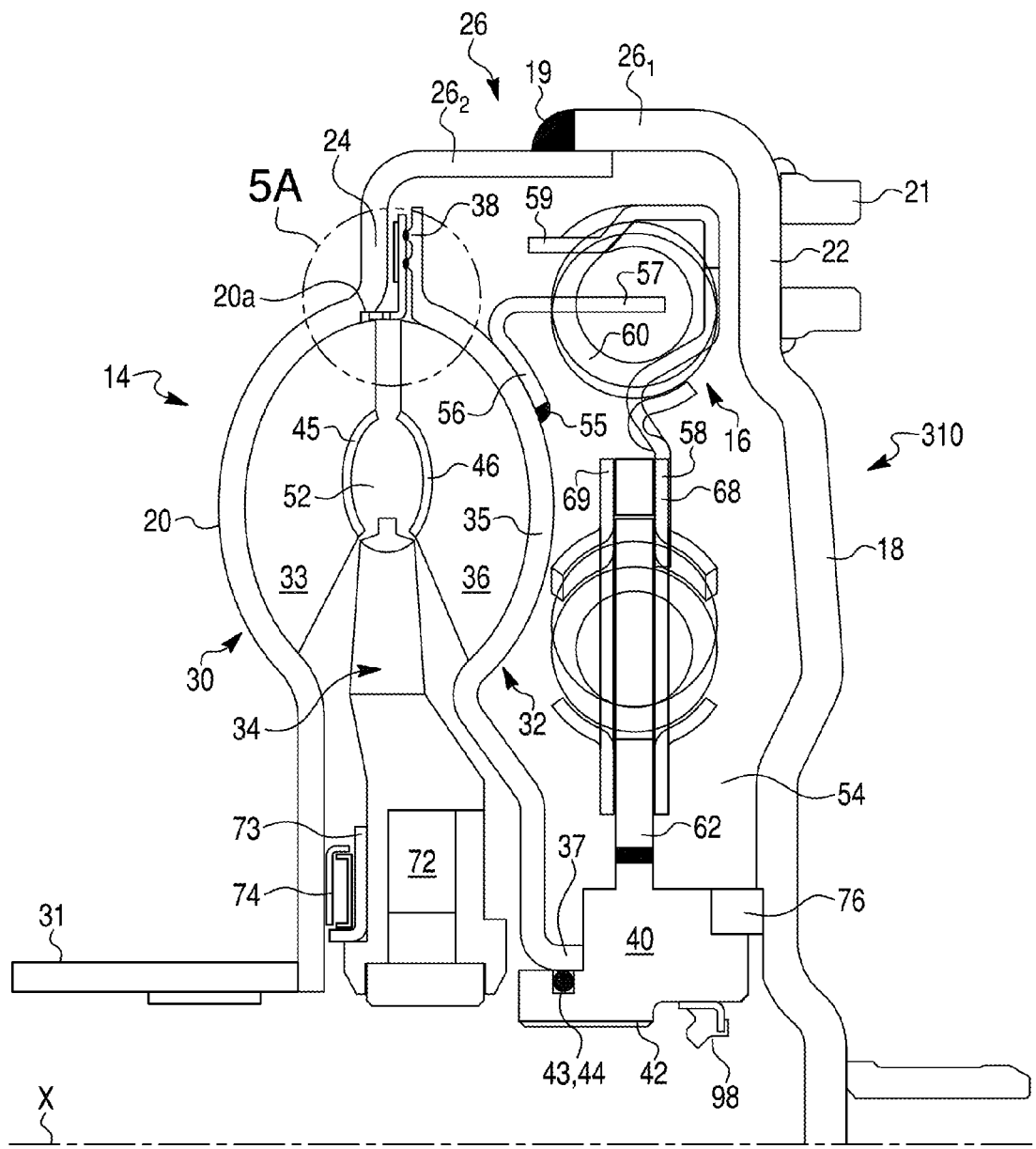

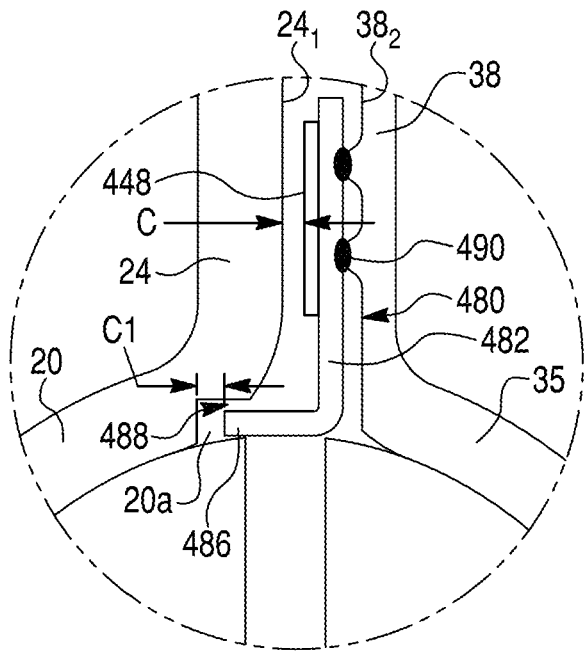
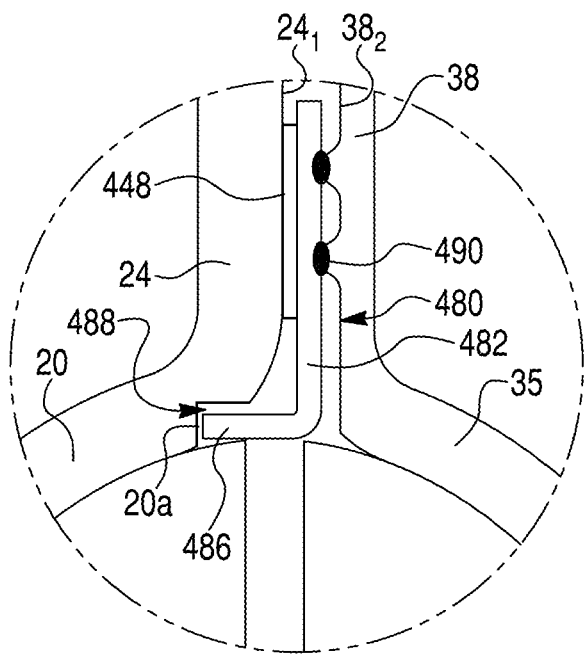

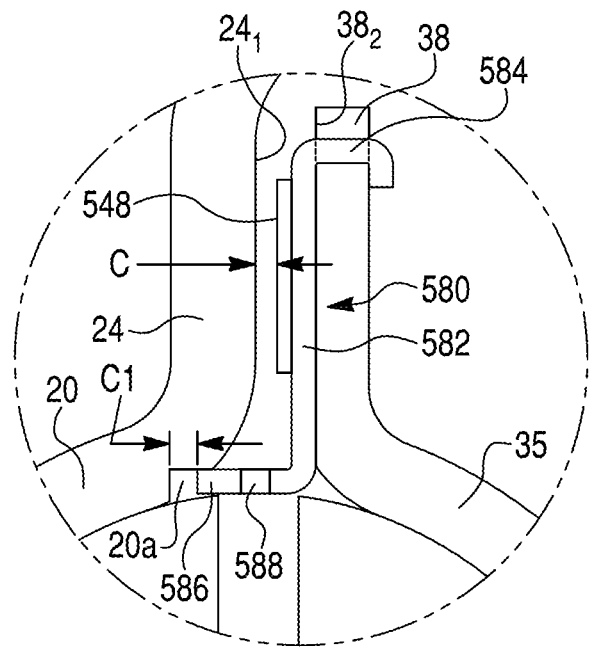
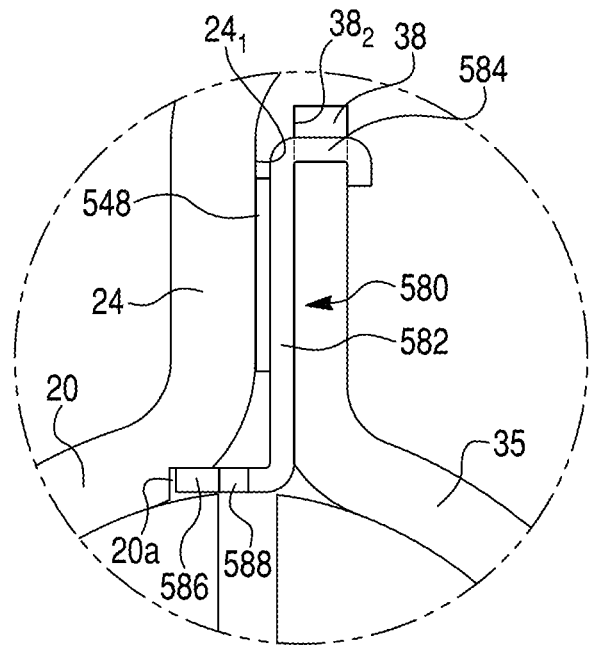

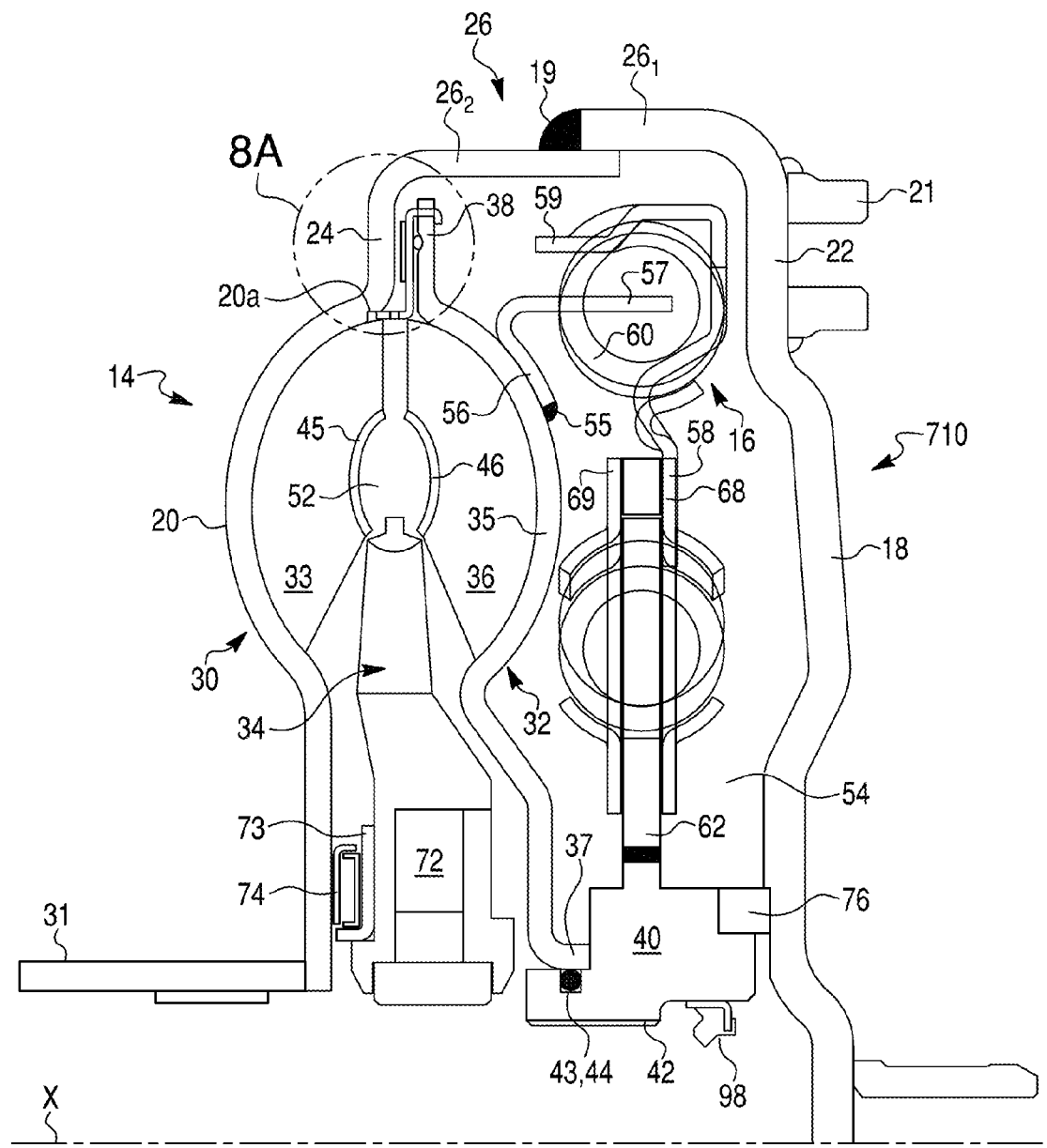

TORQUE CONVERTER AND HYDROKINETIC TORQUE COUPLING DEVICE HAVING TURBINE-PISTON LOCKUP CLUTCH WITH FLOW RESTRICTOR, AND RELATED METHODS

BACKGROUND OF THE INVENTION

1. Field of the Invention

The present invention generally relates to torque converters and hydrokinetic torque coupling devices, and more particularly to torque converters and hydrokinetic torque coupling devices including turbine-piston lockup clutches for mechanically coupling driving and driven shafts.

2. Description of the Related Art

Generally, vehicles with automatic transmissions are equipped with a hydrokinetic torque coupling device for fluidly coupling the driving shaft of an engine to a driven shaft of a transmission. Lockup clutches are known for mechanically coupling the driving and driven shafts under certain operating conditions. Lockup clutches and their operation are described in, for example, U.S. Pat. No. 8,276,723 and U.S. Pat. No. 7,191,879.

While hydrokinetic torque coupling devices with lockup clutches have proven to be useful for vehicular driveline applications and conditions, improvements that may enhance their performance and cost are possible.

As taught hereinbelow, such improvements may derive from, for example, reducing the spatial requirements of components of the hydrokinetic torque coupling device, consolidating functions of two or more components into a single component, and/or improving lockup operation.

BRIEF SUMMARY OF THE INVENTION

According to a first aspect of the invention, there is provided a torque converter rotatable about a rotational axis and having a torus chamber. The torque converter includes an impeller coaxially aligned with the rotational axis, a turbine-piston coaxially aligned with and hydrodynamically drivable by the impeller to rotate about the rotational axis, and a restrictor. The impeller includes an impeller shell and a plurality of impeller blades. The turbine-piston includes a turbine-piston shell and a plurality of turbine blades. The turbine-piston is axially displaceable toward and away from the impeller shell to position the torque converter into and out of a lockup mode in which the turbine-piston is mechanically locked to and non-rotatable relative to the impeller. The restrictor is positioned radially outward of the impeller blades and the turbine blades at an opening of a fluid passageway connecting the torus chamber to an environment outside the torque converter. The restrictor is constructed and arranged to restrict the fluid passageway.

A second aspect of the invention provides a hydrokinetic torque coupling device for coupling together a driving shaft and a driven shaft. The hydrokinetic torque coupling device is rotatable about a rotational axis and includes a casing, a torque converter, and a damper assembly. The casing includes an impeller shell and a casing shell interconnected to and non-rotatable relative to the impeller shell. The casing is rotatable about the rotational axis and has a damper chamber. The torque converter is coaxially aligned with and rotatable about the rotational axis, and has a torus chamber. The torque converter includes an impeller, a turbine-piston, and a restrictor. The impeller includes the impeller shell and a plurality of impeller blades. The turbine-piston is hydrodynamically drivable by the impeller and includes a turbine-piston shell, a plurality of turbine blades, and a drive component. The turbine-piston is axially displaceable relative to the impeller shell to position the torque converter into and out of a lockup mode in which the turbine-piston is mechanically locked to and non-rotatable relative to the casing. The restrictor is positioned radially outward of the impeller blades and the turbine blades at an opening of a fluid passageway connecting the torus chamber and the damper chamber. The damper assembly is located in the damper chamber and includes an input part operatively connected to the drive component of the turbine-piston and an output part operatively connectable to an output hub.

A third aspect of the invention provides a method of assembling a hydrokinetic torque coupling device for coupling a driving shaft and a driven shaft together. A torque converter that is rotatable about a rotational axis and has a torus chamber is provided. The torque converter includes an impeller, a turbine-piston hydrodynamically drivable by the impeller, and a restrictor. The impeller includes an impeller shell and a plurality of impeller blades. The turbine-piston includes a turbine-piston shell, a plurality of turbine blades, and a drive component. The restrictor is positioned radially outward of the impeller blades and the turbine blades at an opening of a fluid passageway connecting the torus chamber and a damper chamber. The torque converter is operatively connected to a damper assembly so that an input part of the damper assembly is connected to the drive component of the turbine-piston. A casing shell is operatively connected to the impeller shell of the torque converter to form a casing that is rotatable about the rotational axis and has a damper chamber in which the damper assembly is located. The turbine-piston is axially displaceable relative to the impeller shell to position the torque converter into and out of a lockup mode in which the turbine-piston is mechanically locked to and non-rotatable relative to the casing.

Other aspects of the invention, including apparatus, devices, systems, coupling devices, converters, processes, and the like which constitute part of the invention, will become more apparent upon reading the following detailed description of the exemplary embodiments.

BRIEF DESCRIPTION OF THE SEVERAL VIEWS OF THE DRAWING(S)

The accompanying drawings are incorporated in and constitute a part of the specification. The drawings, together with the general description given above and the detailed description of the exemplary embodiments and methods given below, serve to explain the principles of the invention. The objects and advantages of the invention will become apparent from a study of the following specification when viewed in light of the accompanying drawings, in which like elements are given the same or analogous reference numerals and wherein:

FIG. 1 is a fragmented half-view in axial cross section of a hydrokinetic torque coupling device equipped with a lockup clutch shown in a non-lockup mode in accordance with a first exemplary embodiment of the present invention;

FIG. 3 is a fragmented half-view in axial cross section of a hydrokinetic torque coupling device equipped with a lockup clutch shown in a non-lockup mode in accordance with a second exemplary embodiment of the present invention;

FIG. 5 is a fragmented half-view in axial cross section of a hydrokinetic torque coupling device equipped with a lockup clutch shown in a non-lockup mode in accordance with a fourth exemplary embodiment of the present invention;

FIG. 6A is an enlarged fragmentary view of circle 6A of FIG. 6 in non-lockup mode, and FIG. 6B is the same view of the fifth exemplary embodiment in lockup mode;

FIG. 7A is an enlarged fragmentary view of circle 7A of FIG. 7 in non-lockup mode, and FIG. 7B is the same view of the sixth exemplary embodiment in lockup mode;

FIG. 9 is a fragmented half-view in axial cross section of a hydrokinetic torque coupling device equipped with a lockup clutch shown in a non-lockup mode in accordance with an eighth exemplary embodiment of the present invention;

Figure 1A:
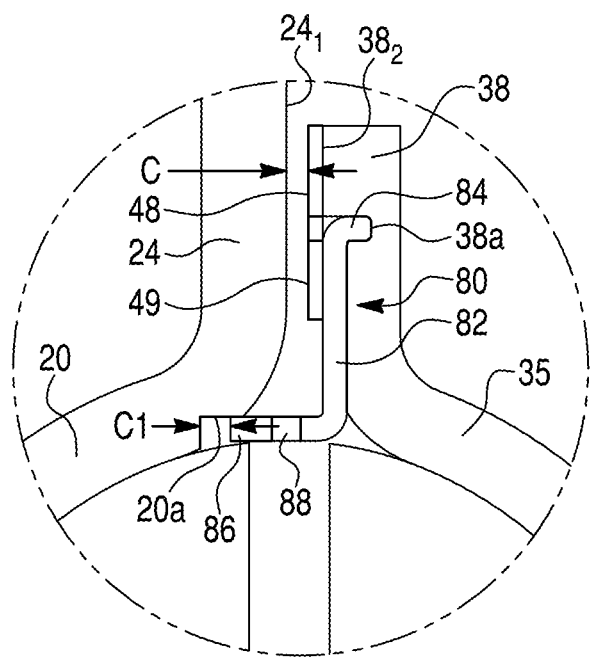
FIG. 1A is an enlarged fragmentary view of circle 1A of FIG. 1 in a non-lockup mode.

DETAILED DESCRIPTION OF EXEMPLARY EMBODIMENT(S) AND EMBODIED METHOD(S) OF THE INVENTION

Reference will now be made in detail to exemplary embodiments and methods of the invention as illustrated in the accompanying drawings, in which like reference characters designate like or corresponding parts throughout the drawings. It should be noted, however, that the invention in its broader aspects is not limited to the specific details, representative devices and methods, and illustrative examples shown and described in connection with the exemplary embodiments and methods.

This description of exemplary embodiments is intended to be read in connection with the accompanying drawings, which are to be considered part of the entire written description. In the description, relative terms such as "horizontal," "vertical," "up," "down," "upper," "lower," "right," "left," "top," and "bottom" as well as derivatives thereof (e.g., "horizontally," "downwardly," "upwardly," etc.) should be construed to refer to the orientation as then described or as shown in the drawing figure under discussion. These relative terms are for convenience of description and normally are not intended to require a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. The term "operatively connected" is such an attachment, coupling or connection that allows the pertinent structures to operate as intended by virtue of that relationship. Additionally, the words "a" and "an" as used in the claims mean "at least one."

Figure 2:
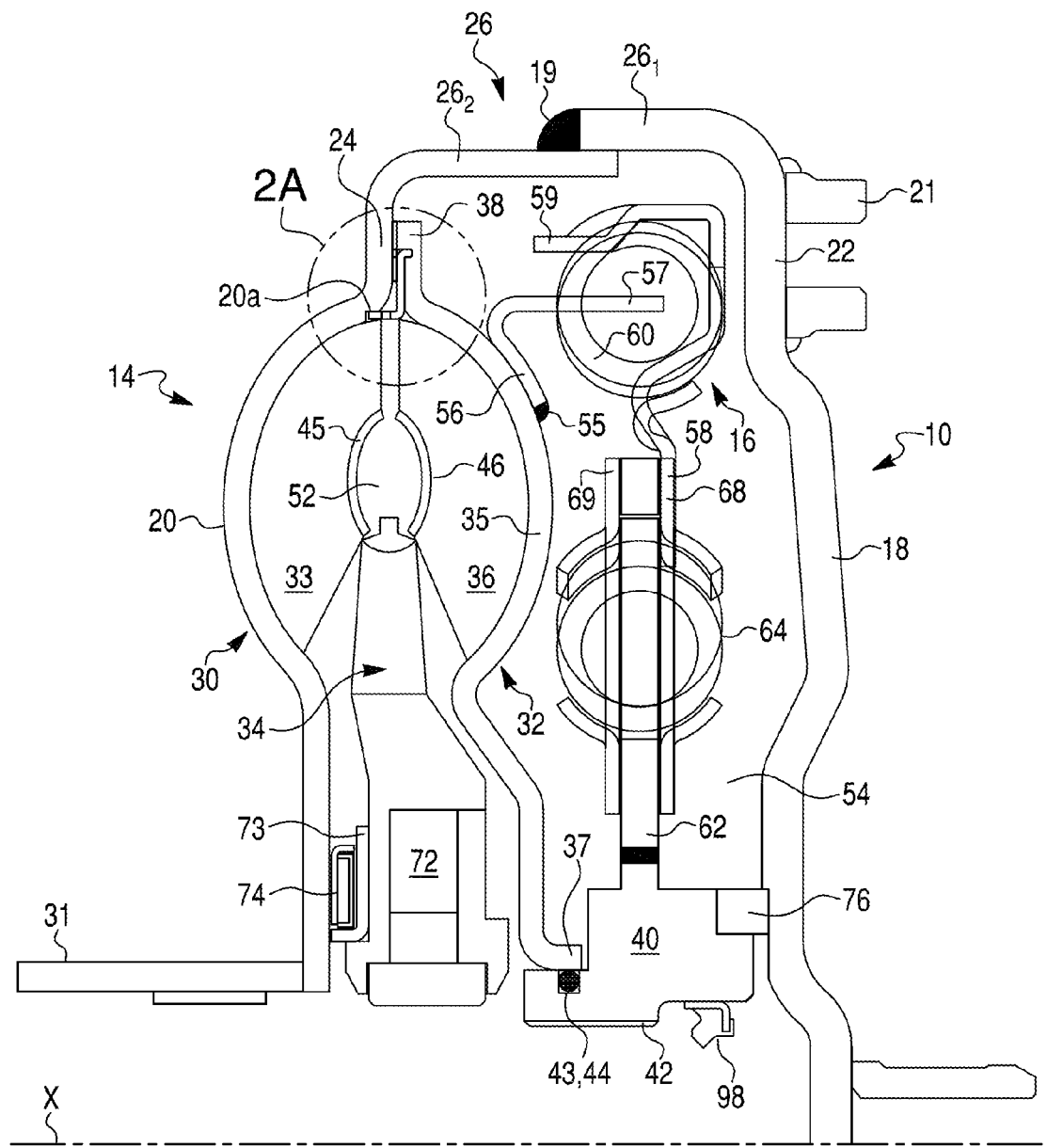
FIG. 2 is a fragmented half-view in axial cross section of the hydrokinetic torque coupling device of the first exemplary embodiment, showing the lockup clutch in a lockup mode.

A first exemplary embodiment of a hydrokinetic torque coupling device is generally represented in the accompanying drawings by reference numeral 10, as best shown in the fragmentary sectional views of FIGS. 1 and 2. The hydrokinetic torque coupling device 10 is operable to fluidly or mechanically couple a driving shaft and a driven shaft of a motor vehicle, such as an automobile. In the typical case, the driving shaft is an output shaft of an internal combustion engine (not shown) of the motor vehicle and the driven shaft is connected to an automatic transmission of the motor vehicle.

The hydrokinetic torque coupling device 10 includes a sealed casing 12 filled with a fluid, such as oil or transmission fluid. The sealed casing 12, a hydrodynamic torque converter 14 and a torsional vibration damper (also referred to herein as a damper assembly) 16 are all rotatable about a rotational axis X. The drawings discussed herein show half-views, that is, the cross section of a portion or fragment of the hydrokinetic torque coupling device 10 above rotational axis X. Generally, the device 10 is symmetrical about the rotational axis X. Herein, the axial and radial orientations are considered with respect to the rotational axis X of the torque coupling device 10. The relative terms such as "axially," "radially," and "circumferentially" are with respect to orientations parallel to, perpendicular to, and circularly around the rotational axis X, respectively.

The sealed casing 12 according to the first exemplary embodiment as illustrated in FIG. 1 includes a first casing shell 18 and a second casing shell 20 fixedly and sealingly connected together, such as by weld 19 at their outer peripheries, so as to be non-movable relative to one another yet rotatable about the axis X. The first shell 18 is interconnected and non-rotatable relative to the driving shaft, more typically a flywheel (not shown) that is fixed to so as to be non-rotatable relative to the driving shaft, so that the casing 12 turns at the same speed that the engine operates. Specifically, in the illustrated embodiment of FIG. 1 the casing 12 is rotatably driven by the internal combustion engine and is coupled to and non-rotatable relative to the flywheel with studs 21, shown in FIG. 1. Each of the first and second casing shells 18, 20 may be made, for example, integrally by press-forming one-piece metal sheets.

Figure 2A:
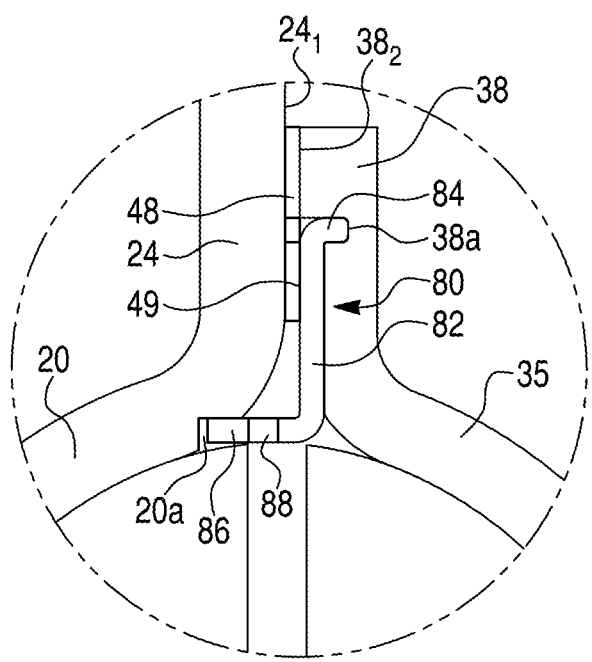
FIG. 2A is an enlarged fragmentary view of circle 2A of FIG. 2 in the lockup mode.

The first casing shell 18 includes a first sidewall portion 22 extending substantially radially relative to the direction from the rotational axis X (i.e., in a plane that is generally transverse to the rotational axis X) and a cylindrical first outer wall portion $26_1$ extending substantially axially from the first sidewall portion 22 towards the second casing shell 20. Similarly, the second casing shell 20 includes a second sidewall portion 24 extending substantially radially relative to the direction from the rotational axis X and a cylindrical second outer wall portion $26_2$ extending substantially axially from the second sidewall portion 24 toward the first casing shell 18. The first and second outer wall portions $26_1$, $26_2$ collectively establish an annular outer wall 26 substantially parallel with the rotation axis X. The weld 19 fixedly secures the outer wall portions $26_1$ and $26_2$ together. Although not shown, the casing 12 may include additional components, such as an annular cylindrical shell welded at opposite ends to and interconnecting the first and second outer wall portions $26_1$, $26_2$. As discussed in greater detail below, and as best shown in FIGS. 1A and 2A with respect to the first embodiment, the second casing shell (or impeller shell) 20 includes an impeller shell recess 20a which may be formed, for example, by conventional machining practice.

The torque converter 14 includes an impeller (sometimes referred to as the pump or impeller wheel) 30, a turbine-piston 32, and a stator (sometimes referred to as the reactor) 34 interposed axially between and operatively connecting the impeller 30 and the turbine-piston 32. The impeller 30, the turbine-piston 32, and the stator 34 are coaxially aligned with one another on the rotational axis X. The impeller 30, the turbine-piston 32, and the stator 34 collectively form a torus. The impeller 30 and the turbine-piston 32 may be fluidly (or hydrodynamically) coupled to one another as known in the art.

The second casing shell 20 of the casing 12 also forms and serves as the impeller shell of the impeller 30. Accordingly, the impeller shell 20 sometimes is referred to as part of the casing 12. The impeller 30 further includes an impeller core ring 45, and a plurality of impeller blades 33 fixedly attached, such as by brazing, to the impeller shell 20 and the impeller core ring 45. The impeller 30, including its shell 20, the impeller core ring 45, and the impeller blades 33, is secured to the first casing shell 18 so as to be non-rotatable relative to the casing 12 and hence to the drive shaft (or flywheel) of the engine so that the impeller 30 rotates at the same speed as the engine output. The impeller 30 includes an impeller hub 31 fixedly secured to the impeller shell 20. The impeller hub 31 is arranged for engagement with a hydraulic pump of the transmission.

The turbine-piston 32 is a consolidation or incorporation of a turbine with a lockup clutch piston. The turbine component of the turbine-piston 32 includes a turbine-piston shell 35, a turbine-piston core ring 46, and a plurality of turbine-piston blades 36 fixedly attached, such as by brazing, to the turbine-piston shell 35 and the turbine-piston core ring 46. The spinning of the impeller 30 causes transmission fluid in the torus to spin the turbine blades 36, and hence the turbine-piston core ring 46 and the turbine-piston shell 35. The impeller shell 20 and the turbine-piston shell 35 collectively define a substantially toroidal inner chamber (or torus chamber) 52 therebetween. As discussed in further detail below, a drive component 56 is affixed to the turbine-piston shell 35, such as by an annular weld 55 and/or fasteners.

The piston component of the turbine-piston 32 includes a substantially annular, planar (i.e., flat) turbine-piston flange (or turbine-piston wall) 38. The turbine-piston flange 38 is distal to the rotational axis X relative to a proximal flange 37 discussed below. The turbine-piston flange 38 is a radial extension of the turbine-piston shell 35 and, as illustrated in FIG. 1, is disposed radially outside of the turbine blades 36. The turbine-piston flange 38 and the turbine-piston shell 35 are embodied as integral with one another, e.g., made of a single or unitary component. Alternatively, the turbine-piston flange 38 and the turbine-piston shell 35 may be separate components connected together. The turbine-piston flange 38 extends from a radially outer peripheral end of the torus region of the turbine-piston shell 35 radially outward, transverse to rotational axis X, to terminate at an end in spaced relationship to the inner peripheral surface of the annular outer wall portion $26_2$ of the casing 12.

As shown in FIGS. 1A and 2A, the turbine-piston flange 38 has a second engagement surface $38_2$ facing the first engagement surface $24_1$ of the second sidewall portion 24. The first and second engagement surfaces $24_1$ and $38_2$ are parallel to and face one another, and extend radially at a 90 degree angle relative to the rotational axis X. The second engagement surface $38_2$ faces and, as explained below, is movable axially toward and away from the first engagement surface $24_1$ to position the coupling device 10 into and out of a lockup mode, respectively.

In accordance with the first exemplary embodiment, the second engagement surface $38_2$ is provided with a radially outer friction ring (or friction lining) 48 and a radially inner friction ring 49, best shown in FIG. 1A, which shows the lockup clutch out of the lockup mode. The friction ring 48 may be secured to the second engagement surface $38_2$, for example, by adhesive bonding and/or with fasteners. The friction ring 48 is made of a friction material for improved frictional performance. Alternatively, a friction ring (or friction lining) may be secured to the first engagement surface $24_1$. According to still another embodiment, a first friction ring or liner is secured to the first engagement surface $24_1$ and a second friction ring or liner is secured to the second (engagement) surface $38_2$. It is within the scope of the invention to omit one or both of the friction rings.

Returning to FIG. 1, the stator 34 is positioned between the impeller 30 and the turbine-piston 32 to redirect fluid from the turbine-piston 32 back to the impeller 30 in an efficient manner. The stator 34 is typically mounted on a one-way clutch 72 to prevent the stator 34 from counter-rotation. A thrust bearing 74 is interposed between a side wall plate 73 of the stator 34 and the impeller shell 20 of the casing 12.

The hydrokinetic torque coupling device 10 further includes an output hub (also referred to as a hub) 40 that is rotatable about the rotational axis X. The output hub 40 is operatively coupled to and coaxial with the driven shaft. For example, the output hub 40 may be provided with internal splines (not shown) for non-rotatably coupling the output hub 40 to the driven shaft, such as a transmission input shaft, provided with complementary external splines or grooves. Alternatively, a weld or other connection may be used to fix the output hub 40 to the driven shaft. A radially outer surface of the output hub 40 includes an annular slot 43 for receiving a sealing member, such as an O-ring 44. A sealing member 98, mounted to a radially inner peripheral surface of the output hub 40, creates a seal at the interface of a transmission input shaft (not shown) and the output hub 40.

Extending axially at a radially inner peripheral end of the turbine-piston shell 35 is a substantially cylindrical flange 37 that is proximate to the rotational axis X relative to the opposite end of the turbine-piston shell 35. The substantially cylindrical flange 37 of the turbine-piston 32 is rotatable relative to the output hub 40. The sealing member (e.g., O-ring) 44 creates a seal at the interface of the substantially cylindrical flange 37 and the output hub 40. As discussed in further detail below, the turbine-piston 32 is axially movably relative to the output hub 40 along this interface. Abutment of the end of the flange 37 against the output hub 40, as shown in FIG. 1, limits axial displacement of the turbine-piston 32 to a maximum axial displacement position. The output hub 40 thus acts as a stop feature with respect to axial displacement of the turbine-piston 32 out of lockup mode.

The damper assembly 16 is housed in the casing 12 axially between the turbine-piston 32 and the first casing shell 18, as shown in FIG. 1. The torsional vibration damper 16 is connected to a plurality of circumferentially spaced driving tabs 57 of the drive member 56, and includes a plurality of first (or radially outer) circumferential elastic damping members 60, an intermediate member 58 drivenly coupled to the drive member 56 through the first circumferential damping members 60, a plurality of second (or radially inner) circumferential elastic damping members 64, and a driven (or output) member 62 drivenly coupled to the intermediate member 58 through the second circumferential damping members 64. The first circumferential damping members 60 are radially outward from the second circumferential damping members 64. According to the exemplary embodiment of FIG. 1 and other embodiments discussed herein, the first and second damping members 60, 64 are configured as helical (or coil) springs having principal axes oriented substantially circumferentially. Other elastic members may be selected to replace or supplement the springs.

The drive member 56 includes a plurality of driving tabs 57 (FIG. 1) extending axially in the direction away from the turbine-piston 32. The driving tabs 57 of the drive member 56 are circumferentially equidistantly spaced from one another, and engage first circumferential ends of the first damping members 60. The intermediate member 58 has a plurality of driven tabs 59 extending axially in an opposition direction to the driving tabs 57 of the drive member 56. The driven tabs 59 of the intermediate member 58 are circumferentially equidistantly spaced from one another, and engage the opposite second circumferential ends of the first damping members 60 than the driving tabs 57. The intermediate member 58 and the driven tabs 57 of the damper assembly 16 are rotatable relative to the drive member 56 and its driving tabs 57 due to elasticity of the first damping members 60, which absorb torsional vibration.

Additionally, the driving tabs 57 of the drive member 56 are axially movable relative to the driven tabs 59 of the intermediate member 58. This relative axial movement between the driving tabs 57 and the driven tabs 59 may become necessary during axial movement of the turbine-piston 32 between its lockup and non-lockup modes. As discussed in greater detail below, when the turbine-piston 32 shifts axially due to a lockup event, the driving tabs 57 move axially relative to the driven tabs 59. Thus, the drive member 56 is both axially and circumferentially moveable relative to the intermediate member 58, and generally to the damping assembly 16.

The radially inner portion of the intermediate member 58 forms or is connected to, and may be integrally formed as a single piece with, a first disk part 68 on a first side of the second damping members 64. The first disk part 68 is secured to and non-moveable relative to a second disk part 69 on the opposite side of the second damping members 64, such as by rivets or welding. The first and second disk parts 68, 69 establish an input part to the second damping members 64.

The driven member 62 establishes an output part relative to the second damping members 64. The driven member 62 has windows in which the second damping members 64 are set. The disk parts 68, 69 engage first ends of the second damping members 64, and the driven member 62 engages second ends of the second damping members 64. The disk parts 68, 69 of the intermediate member 58 are thus rotatable relative to the driven member 62, with the second damping members 64 absorbing torsional vibration due to their elasticity.

The driven member 62 is fixedly connected to so as to be non-rotatable relative to the output hub 40. The non-rotatable connection between the driven member 62 and the output hub 40 may be established by splines or welding. Alternatively, the output hub 40 and driven member 62 may be integral with one another. A thrust bearing 76 is positioned between the output hub 40 and the first casing shell 18. A radially inner surface of the output hub 40 includes splines 42 for engaging (non-rotatably relative to) the driven shaft of the transmission.

The turbine-piston 32 is axially movable toward and away from the impeller shell 20 between a lockup position and a non-lockup (open) position. In the lockup mode depicted in FIGS. 2 and 2A, the first and second engagement surfaces $24_1$ and $38_2$ (or friction ring(s) 48 secured thereto) are pressed together such that the turbine-piston flange 38 is frictionally non-rotatably coupled to the second radial portion 24 of the casing 12, thereby mechanically locking the turbine-piston 32 to the casing 12 in the lockup mode. When not in the lockup mode, as depicted in FIG. 1, the first and second engagement surfaces $24_1$ and $38_2$ are spaced from one another, such that the turbine-piston flange 38 is not frictionally non-rotatably coupled to the second radial portion 24 of the casing 12. In the non-lockup mode, normal operation of the torque converter 14 selectively fluidly (or hydrodynamically) couples and decouples the impeller 30 to and from the turbine-piston 32.

Axial movement of the turbine-piston 32 is accomplished by changing the pressure differential between the opposite sides of the turbine-piston shell 35. Referring to FIGS. 1 and 2, a torus chamber 52 is to the left side of the turbine-piston shell 35, and a damper chamber 54 is to the other (right) side of the turbine-piston shell 35. A pressure increase in the damper chamber 54 relative to the torus chamber 52 (or stated differently a pressure decrease in the torus chamber 52 relative to the damper chamber 54) shifts the turbine-piston 32 axially in the direction of torque transmission, i.e., towards the output side of the casing 12, that is right to left in FIGS. 1 and 2, into the lockup mode. On the other hand, a pressure decrease in the damper chamber 54 relative to the torus chamber 52 (or stated differently a pressure increase in the torus chamber 52 relative to the damper chamber 54) shifts the turbine-piston 32 axially against the direction of torque transmission, i.e., towards the input side of the casing, that is left to right in FIGS. 1 and 2, out of the lockup mode. Pressure changes are created by controlling the fluid, e.g., hydraulic fluid or oil, in the chambers 52 and 54.

Referring to FIGS. 1A and 2A in connection with the first embodiment, a flow passage restrictor is generally designated by reference numeral 80. The flow passage restrictor 80 includes an "S"-shaped annular restriction plate 82 extending radially outwardly between the first engagement surface $24_1$ of the impeller shell 20 and the second engagement surface $38_2$ of the turbine-piston flange 38 of the turbine-piston shell 35, as illustrated in FIGS. 1-2A. The flow passage restrictor 80 is in the form of a rolled metal strip having a radially outer first leg 84 and a radially inner second leg 86 located radially inside of the radially outer first leg 84, as best shown in FIGS. 1A and 2A. The first leg 84 extends axially and is press fit or otherwise positioned into a recess 38a, such as a machined recess, of the turbine-piston flange 38. The second leg 86 is received farther into the impeller shell recess 20a in the lockup mode than the non-lockup mode due to movement of the turbine-piston shell 35 towards the impeller shell 20. The second leg 86 extends axially to form a cylinder of a relatively small width. The portion of the flow passage restrictor 80 engaged in the turbine shell (i.e., the first leg 84 engaged in the recess 38a) secures the restrictor 80 radially outside of the ends of the turbine blades 36 and/or the ends of the impeller blades 33.

In non-lockup mode, the gap between the edge of the impeller shell recess 20a and the edge of the radially inner second leg 86 has a distance designated "C1" in FIG. 1A. The gap between, on the one hand, the first engagement surface $24_1$, and on the other hand the friction ring 48 and coplanar frictional ring 49 on the restriction plate 82, has a distance designated by the letter "C" in FIG. 1A. Gap distance "C1" is slightly greater than gap distance "C" (C1>C) such that in lockup mode, there is a small gap between the edge of the impeller shell recess 20a and the restriction plate 82, thus preventing contact between the edge of the impeller shell recess 20a and the edge of the second leg 86 from impeding axial movement of the turbine-piston 32 or frictional engagement of the engagement surfaces $24_1$ and $38_2$ (more specifically the first engagement surface $24_1$ and the concentric radially outer and inner friction rings 48, 49 of the second engagement surface $38_2$) into the lockup mode. It should be understood that frictional rings 48, 49 may be combined together into a single frictional ring.

Passages 88 in the form of holes are equidistantly spaced from one another about the circumference of the annular restriction plate 82. (See FIG. 10C in connection with the ninth exemplary embodiment as an example of circumferential spacing of passages (888 in FIG. 10C).) The passages 88 restrict the flow of fluid, e.g., hydraulic fluid, from the torus chamber 52 to outside the torus chamber 52 and the torque converter 14, e.g., into the damper chamber 54 in the hydrokinetic torque coupling device 10. In the illustrated first embodiment, the flow restriction occurs at the opening of the passageway connecting the torus chamber 52 to the damper chamber 54. FIG. 1 shows the torque converter 14 in a maximum axial displacement position, or fully open position, in which the end of the flange 37 abuts the output hub 40 to limit further axial displacement of the turbine-piston 32 away from the impeller 30. In this maximum axial displacement position, the distance (or width) between the first engagement surface $24_1$ and the frictional rings 48, 49 of the second engagement surface $38_2$ provides a passageway of greater area than the collective areas of the passages 88. The greater restriction to the passages 88 increases the pressure drop between the torus chamber 52 and the damper chamber 54. This heightened pressure drop reduces the chances of unintended/premature axial displacement of the turbine-piston 32 into lockup mode.

In the lockup mode depicted in FIG. 2, the turbine-piston 32 is displaced axially towards the impeller 30 so that the frictional rings 48 and 49 of the second engagement surface $38_2$ of the turbine-piston flange 38 abut against and are non-rotatably frictionally coupled to the first engagement surface $24_1$ of the casing 12. In the lockup mode, torque is transferred from the engine to the casing 12, then by way of the frictional engagement between surfaces $24_1$ and $38_2$ (that is, the frictional linings 48 and 49 thereof) through the turbine piston shell 35 to the drive member 56 welded thereto, then serially to the damping assembly 16 and the output hub 40. Thereby, the turbine-piston flange 38 and the casing 12 together create a lockup clutch that bypasses the hydrodynamic fluid coupling of the torque converter 14 and mechanically interlocks the driving and driven shafts to one another.

As the turbine-piston 32 and the drive member 56 move axially into the lockup position as described above, the driving tabs 57 of the drive member 56 are axially displaced relative to the driven tabs 59 of the intermediate member 58. The axial movement of the driving tabs 57 relative to the driven tabs 59 allows the intermediate member 58, the driven member 62, and the damping members 60, 64 to remain fixed axially on the output hub 40 while the turbine-piston 32 and the drive member 56 move in the axial direction. Notably, the friction rings 48 and 49 secured to the second engagement surface $38_2$ may have circumferentially spaced grooves (not shown) extending generally radially so as to fluidly connect the torus chamber 52 and the damper chamber 54 with one another in the lockup mode for cooling friction surfaces of the lockup clutch 50 by the working fluid.

In the non-lockup mode, the turbine-piston 32 is displaced axially away from the impeller 30, axially moving the turbine-piston shell 35 and the turbine-piston flange 38 so that the second engagement surface $38_2$ (including the frictional rings 48, 49 thereof) is spaced from and no longer non-rotatably frictionally coupled to the first engagement surface $24_1$. Thus, torque transferred from the engine to the casing 12 does not bypass the torque converter 14 through the lockup clutch. Driving tabs 57 move axially away from the driven tabs 59 as the lockup clutch is moved from lockup to non-lockup mode. Notably, in the non-lockup mode an open fluid passage is established between the first engagement surface $24_1$ of the casing 12 and the second engagement surface $38_2$ for permitting fluid flow between the torus chamber 52 and the damper chamber 54. The fluid flows through passages 88, which provide a smaller, more restrictive pathway than established between the engagement surfaces $24_1$ and $38_2$ in the non-lockup mode.

As discussed above, the hydrodynamic pressures in the torus chamber 52 and the damper chamber 54 are managed to move the torque converter 14 into and out of lockup mode. The flow passage restrictor 80 improves control over the pressure within the torus chamber 52 to self-adjust the position of the turbine-piston 32 and thereby reduces or prevents unintended lockup when the torque converter 14 is operating in the hydrodynamic transmission mode. The flow passage restrictor 80 desirably maintains the torque converter 14 in the hydrodynamic transmission mode regardless of changes to conditions in the external environment, e.g., in the damper chamber 54, until such time as pressure in the torus chamber 52 is altered to move the turbine-piston 32 into lockup mode.

In operation, the lockup clutch is generally activated after the hydrodynamic coupling of the driving and driven shafts, typically at relatively constant speeds, in order to avoid the loss of efficiency caused in particular by slip phenomena between the turbine-piston 32 and the impeller 30. Because of the axial pressures acting on the turbine-piston 32 for movement between its lockup and non-lockup positions, the turbine-piston shell 35 may be made somewhat thicker than typical turbine shells that do not form or function as the lockup piston. Although not shown, a biasing member, such as a spring, may be included in the hydrokinetic torque coupling device 10 to axially urge the turbine-piston 32 into or out of lockup mode.

The turbine-piston 32 both forms the shell component of the turbine and the piston component of the lockup clutch, as described above. By consolidating two components that are normally separate from one another into a single component, space is saved in the hydrokinetic torque coupling device 10. This space-saving structure provides several design options. For example, the hydrokinetic torque coupling device 10 can be made smaller and lighter. Alternatively, the free space within the casing 12 can be used to add additional components, such as damping components.

Various modifications, changes, and alterations may be practiced with the above-described embodiment. In the interest of brevity, reference characters that are discussed above in connection with FIGS. 1, 1A, 2, and 2A are not further elaborated upon below, except to the extent necessary or useful to explain the additional embodiments. The features of the embodiments described herein may be practiced with one another and are substitutable in various combinations. For example, FIGS. 3-10D illustrated additional exemplary embodiments. In the interest of brevity, the following description generally focuses on differences between the first exemplary embodiment and the following additional exemplary embodiments of FIGS. 3-10D.

Figure 3A:
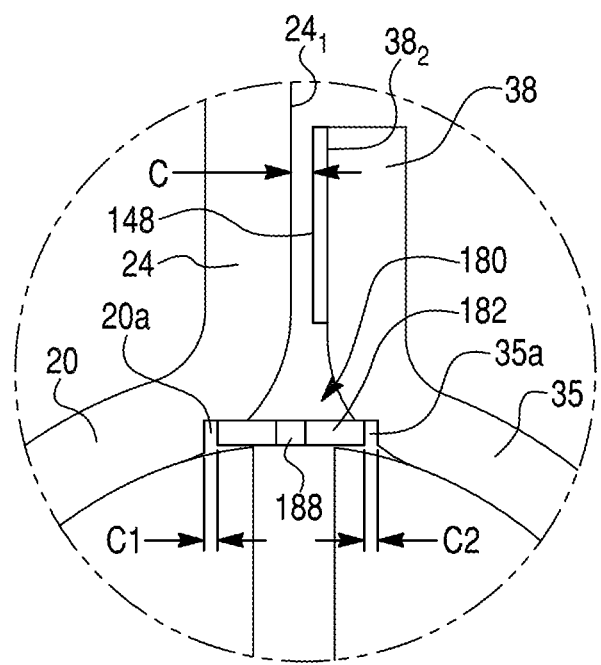
FIG. 3A is an enlarged fragmentary view of circle 3A of FIG. 3 in non-lockup mode.
Figure 3B:
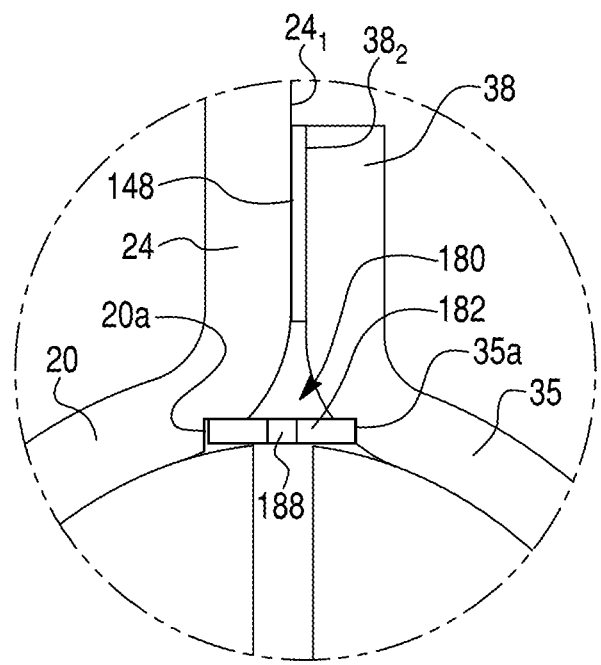
FIG. 3B is the same view of the second exemplary embodiment in lockup mode.

FIGS. 3, 3A, and 3B illustrate a second exemplary embodiment of a hydrokinetic torque coupling device 110 similar to device 10, with the following notable differences. The hydrokinetic torque coupling device 110 features a flow passage restrictor 180 in the form of a flat, axially biased annular plate 182 having opposite edges. The opposite edges are received in the impeller shell recess 20a and a recess 35a of the turbine-piston shell 35 in lockup mode, and preferably are at least partially received in those recesses 20a, 35a in non-lockup mode. The annular plate 182 does not include flanged ends or legs. In the non-lockup mode, a first gap of distance "C1" is present between the edge of the impeller shell recess 20a and a first edge of the annular plate, and a second gap of distance "C2" is present between the edge of the turbine-piston recess 35a and an opposite second edge of the annular plate 182. The combined gap distances C1 and C2 is slightly greater than the gap distance "C" between the friction ring 148 and the first engagement surface 24$_1$ (C1+C2>C), thus ensuring that the flow passage restrictor 180 does not impede axial movement of the turbine-piston 32 into lockup mode or prevent frictional engagement of the engagement surfaces 24$_1$ and 38$_2$ (more specifically friction ring 148 of the second engagement surface 38$_2$). Passages 188 in the form of holes are equidistantly spaced from one another about the circumference of the annular plate 182. The passages 188 restrict the flow of fluid, e.g., hydraulic fluid, from the torus chamber 52 to outside the torus chamber 52, e.g., into the damper chamber 54 in the hydrokinetic torque coupling device 110. The passages 188 collectively provide a smaller flow area than the annular flow passageway between the first engagement surface 24$_1$ and the friction ring 148 in the maximum axial displacement position shown in FIG. 3.

Figure 4:
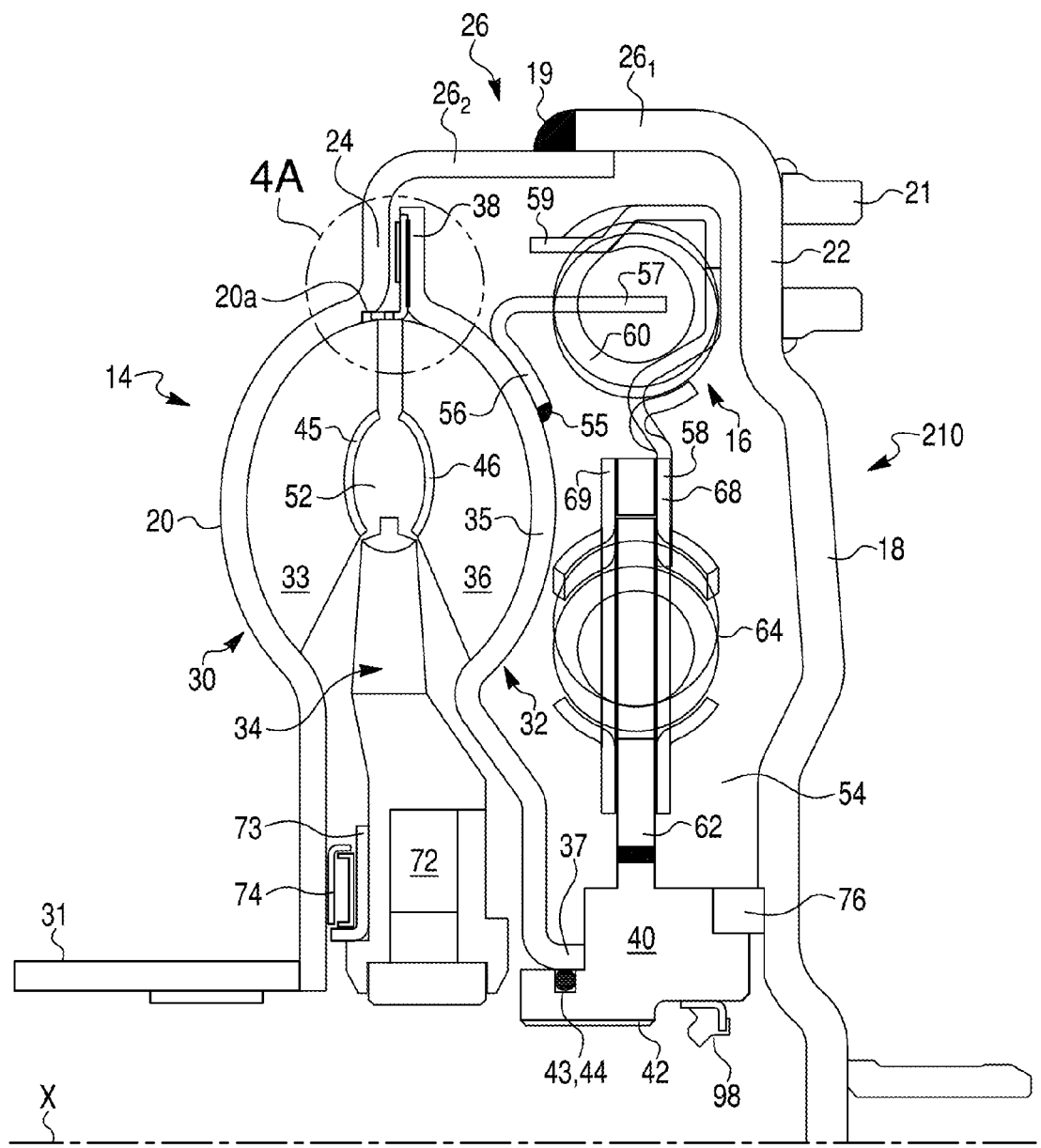
FIG. 4 is a fragmented half-view in axial cross section of a hydrokinetic torque coupling device equipped with a lockup clutch shown in a non-lockup mode in accordance with a third exemplary embodiment of the present invention.
Figure 4A:
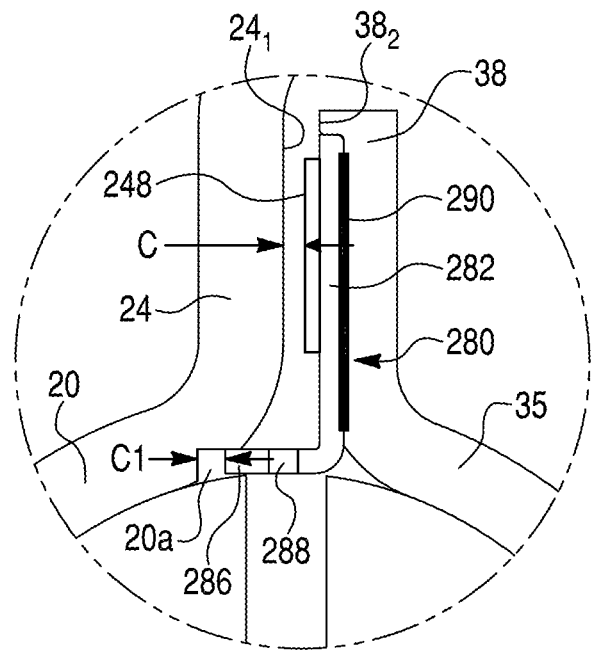
FIG. 4A is an enlarged fragmentary view of circle 4A of FIG. 4 in non-lockup mode.
Figure 4B:
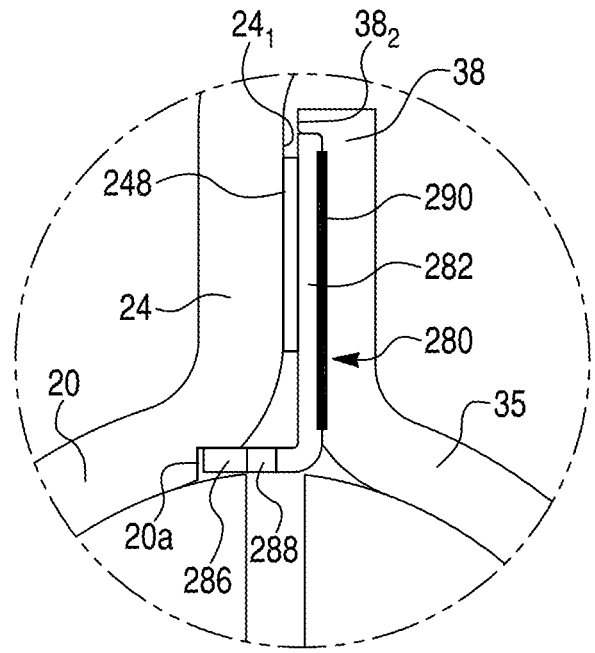
FIG. 4B is the same view of the third exemplary embodiment in lockup mode.

FIGS. 4, 4A, and 4B illustrate a third exemplary embodiment of a hydrokinetic torque coupling device 210 similar to device 10, with the following notable differences. The hydrokinetic torque coupling device 210 features a flow passage restrictor 280 in the form of an L-shaped annular plate 282 having a radially extending body and an axially extending leg 286. Adhesive material 290 adheres a radially extending body of the annular plate 282 to turbine-piston flange 38, although it should be understood that fasteners can be used instead or in cooperation with the adhesive material 290. The axially extending leg 286 is at least partly received in the impeller shell recess 20a in lockup mode. Out of lockup mode, the leg 286 is partly or fully withdrawn from the impeller shell recess 20a due to movement of the turbine-piston flange 38 away from the first engagement surface 24$_k$. In non-lockup mode, a first gap having a distance "C1" between the edge of the impeller shell recess 20a and an edge of the leg 286 is greater than a second gap distance "C" between the friction ring 248 and the first engagement surface 24$_1$ (C1>C), thus ensuring that the flow passage restrictor 280 does not impede axial movement of the turbine-piston 32 into lockup mode or prevent frictional engagement of the engagement surfaces 24$_1$ and 38$_2$ (more specifically friction ring 248 of engagement surface 38$_2$). Passages 288 in the form of holes are equidistantly spaced from one another about the circumference of the annular plate 282. The passages 288 restrict the flow of fluid, e.g., hydraulic fluid, from the torus chamber 52 to outside the torus chamber 52, e.g., into the damper chamber 54 in the hydrokinetic torque coupling device 210, providing a smaller flow area than is otherwise provided by the annular space between the first engagement surface 24$_1$ and the frictional ring 248 in the maximum axial displacement position shown in FIG. 4.

Figure 5A:
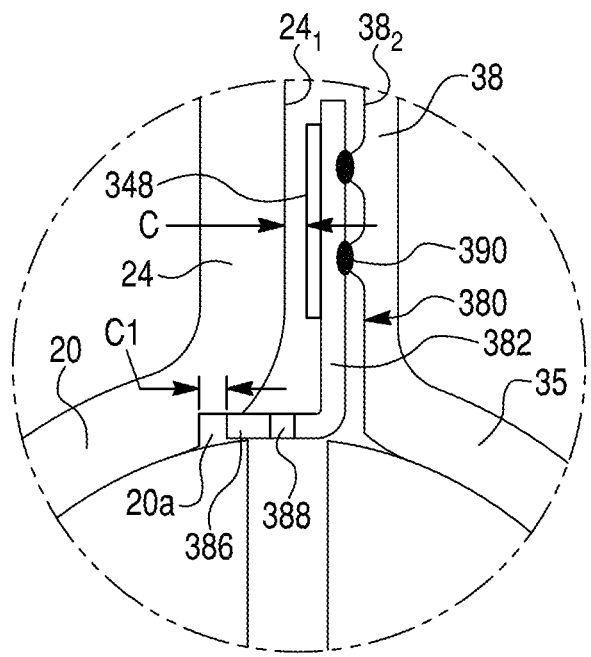
FIG. 5A is an enlarged fragmentary view of circle 5A of FIG. 5 in non-lockup mode.
Figure 5B:
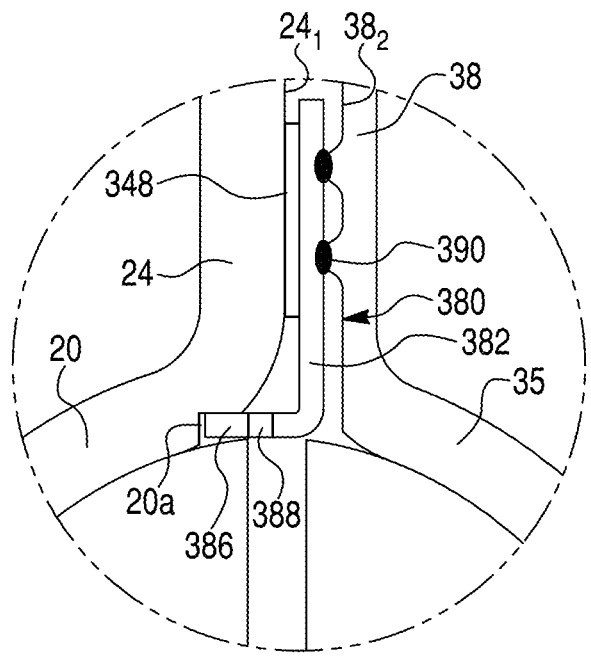
FIG. 5B is the same view of the fourth exemplary embodiment in lockup mode.

FIGS. 5, 5A, and 5B illustrate a fourth exemplary embodiment of a hydrokinetic torque coupling device 310 similar to device 210, with the following notable differences. The hydrokinetic torque coupling device 310 features a flow passage restrictor 380 including an L-shaped annular plate 382 having a body welded to the turbine-piston flange 38 by welds 390. The flow passage restrictor 380 includes an axially extending leg 386 with passages 388. The friction ring 348 is secured to the body of the annular plate. In non-lockup mode, the gap distance C1 between an edge of the leg 386 and the edge of the impeller shell recess 20a is greater than a gap distance C (C1>C) between first engagement surface 24$_1$ and the frictional ring 348 so as not to impede movement of the turbine-piston 32 into lockup mode, similarly to the device 210 of the third exemplary embodiment. The passages 388 restrict the flow of fluid, e.g., hydraulic fluid, from the torus chamber 52 to outside the torus chamber 52, e.g., into the damper chamber 54 in the hydrokinetic torque coupling device 310, providing a smaller flow area than is otherwise provided by the annular space between the first engagement surface $24_1$ and the frictional ring 348 in the maximum axial displacement position shown in FIG. 5.

Figure 6:
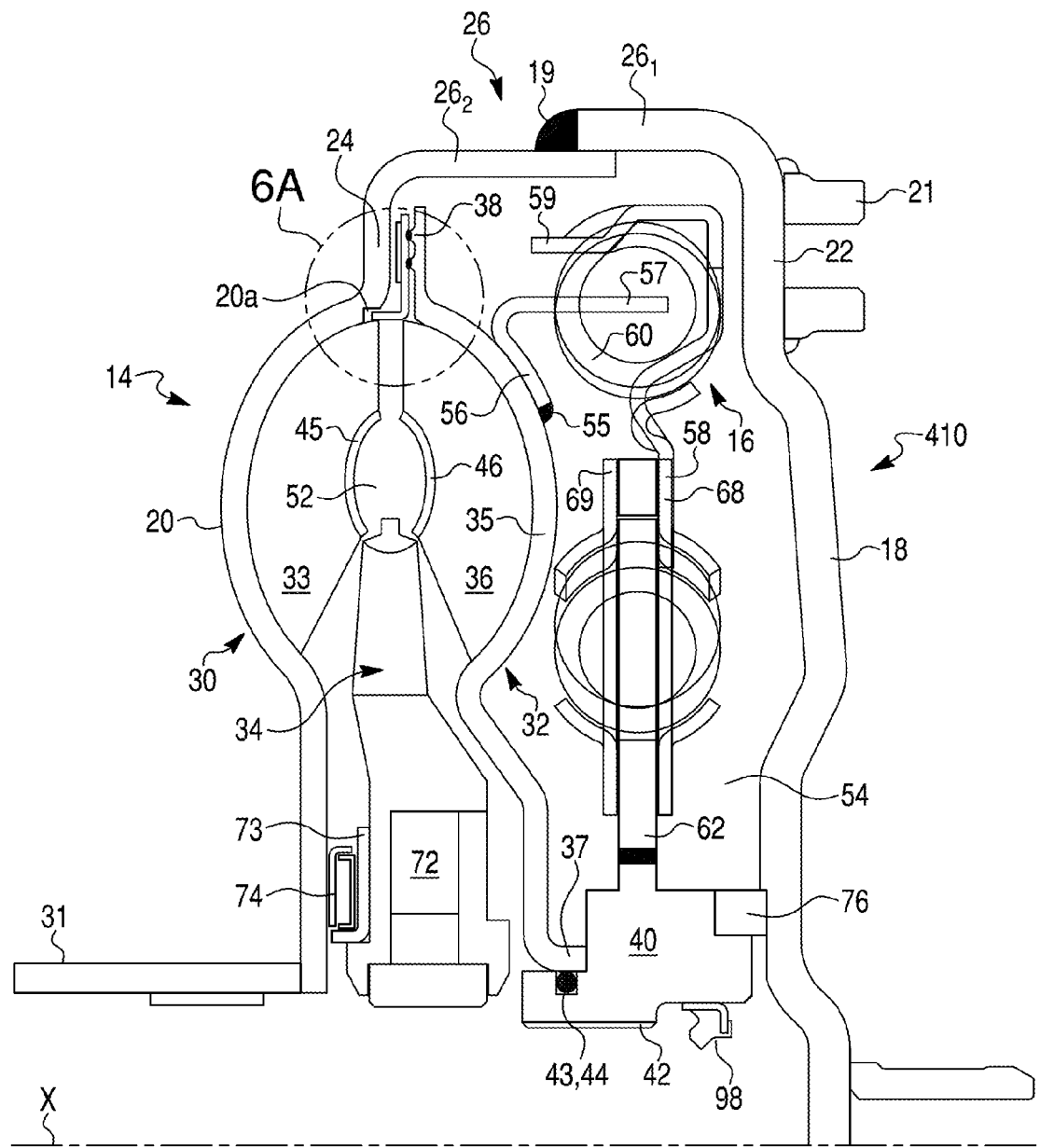
FIG. 6 is a fragmented half-view in axial cross section of a hydrokinetic torque coupling device equipped with a lockup clutch shown in a non-lockup mode in accordance with a fifth exemplary embodiment of the present invention.

FIGS. 6, 6A, and 6B illustrate a fifth exemplary embodiment of a hydrokinetic torque coupling device 410 similar to device 310, with the following notable differences. Like device 310, the flow passage restrictor 480 includes an L-shaped annular plate 482 having a first side welded at welding spots 490 to turbine-piston flange 38 and an opposite second side with the frictional ring 448 secured thereto. However, an axially extending leg 486 does not include passages in the form of holes for restricting flow (such as passages 388 of device 310). Rather, flow restriction is accomplished by an annular gap 488 between the edge of the leg 486 and a first edge of the impeller shell recess 20a and/or between a radially outer surface of the leg 486 and a second edge of the impeller shell recess 20a. The annular gap 488 restricts the flow of fluid, e.g., hydraulic fluid, from the torus chamber 52 to outside the torus chamber 52, e.g., into the damper chamber 54 in the hydrokinetic torque coupling device 410, providing a smaller flow area than is otherwise provided by the annular space between the first engagement surface $24_1$ and the frictional ring 448 in the maximum axial displacement position shown in FIG. 6.

Figure 7:
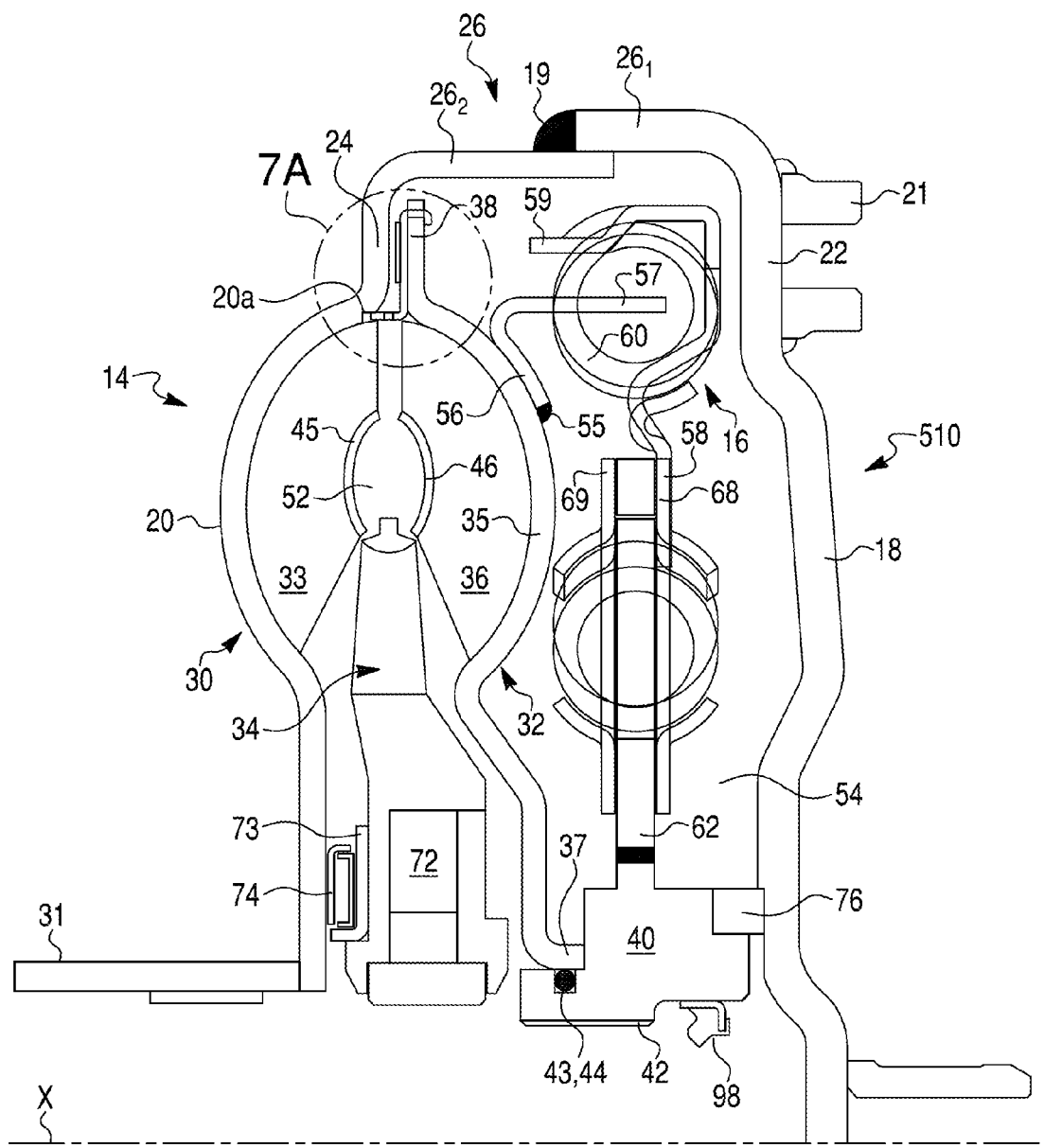
FIG. 7 is a fragmented half-view in axial cross section of a hydrokinetic torque coupling device equipped with a lockup clutch shown in a non-lockup mode in accordance with a sixth exemplary embodiment of the present invention.

FIGS. 7, 7A, and 7B illustrate a sixth exemplary embodiment of a hydrokinetic torque coupling device 510 similar to device 10, with the following notable differences. Like device 10, the hydrokinetic torque coupling device 510 features a flow passage restrictor 580 in the form of a "S"-shaped annular plate 582 having a radially outer leg 584 and a radially inner leg 586. The radially outer leg 584 is in the form of hook-shaped rolled tabs that sit in radially extending slots of the turbine-piston flange 38. The inner leg 586 includes flow restricting passages 588 (similar to passages 88). The frictional ring 548 is secured to the side of the annular plate 582 facing the first engagement surface $24_1$. The gap distance C1 between the edge of the radially inner leg 586 and the edge of the impeller shell recess 20a is greater than the gap distance C between the first engagement surface $24_1$ and the surface of the frictional ring 548. The passages 588 restrict the flow of fluid, e.g., hydraulic fluid, from the torus chamber 52 to outside the torus chamber 52, e.g., into the damper chamber 54 in the hydrokinetic torque coupling device 510, providing a smaller flow area than is otherwise provided by the annular space between the first engagement surface $24_1$ and the frictional ring 548 in the maximum axial displacement position shown in FIG. 7.

Figure 8:
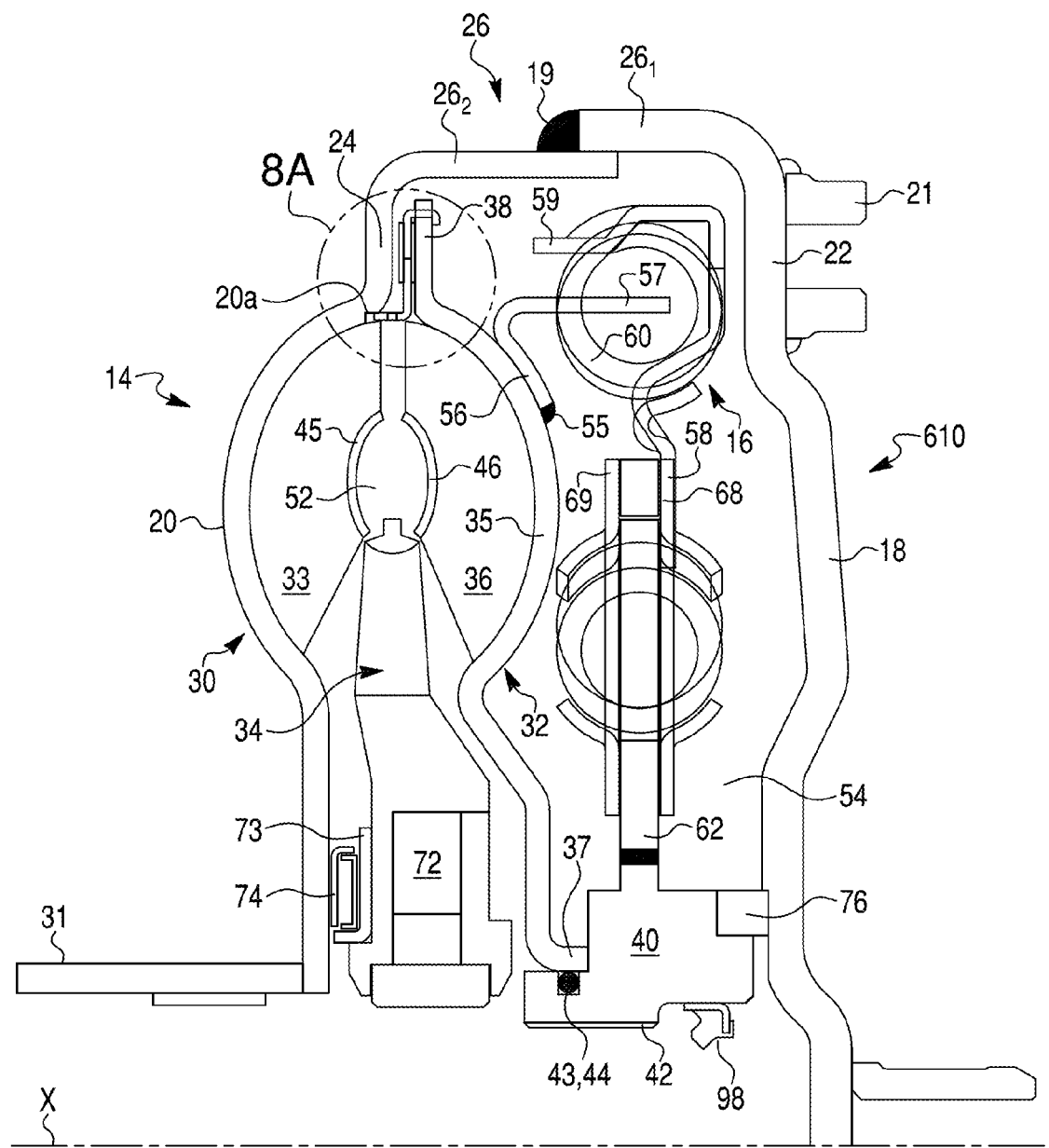
FIG. 8 is a fragmented half-view in axial cross section of a hydrokinetic torque coupling device equipped with a lockup clutch shown in a non-lockup mode in accordance with a seventh exemplary embodiment of the present invention.
Figure 8A:
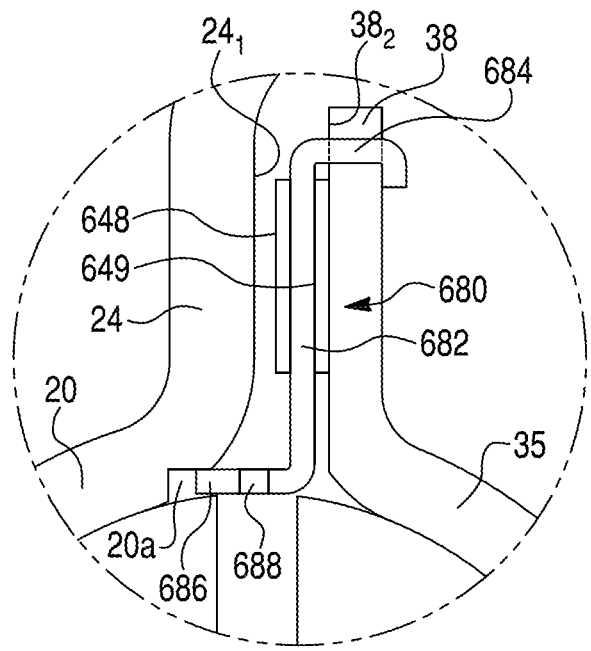
FIG. 8A is an enlarged fragmentary view of circle 8A of FIG. 8 in non-lockup mode.
Figure 8B:
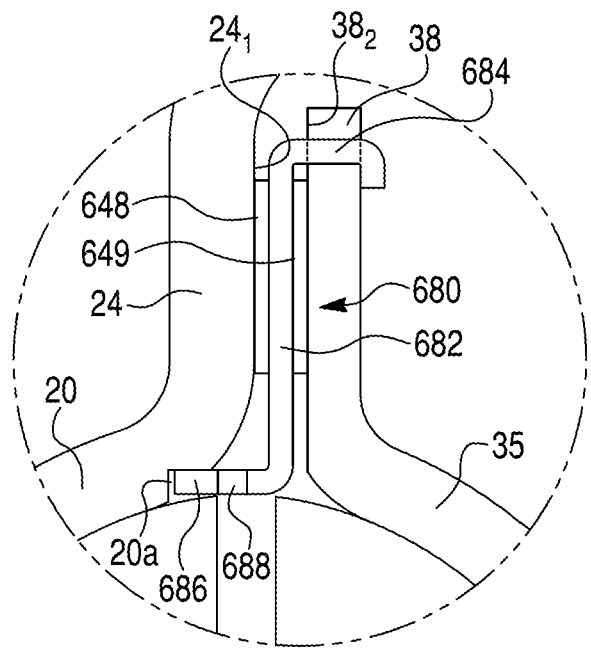
FIG. 8B is the same view of the seventh exemplary embodiment in lockup mode.

FIGS. 8, 8A, and 8B illustrate a seventh exemplary embodiment of a hydrokinetic torque coupling device 610 similar to device 510. The hydrokinetic torque coupling device 610 features a flow passage restrictor 680 in the form of an "S"-shaped annular plate 682 having a radially outer leg 684 and a radially inner leg 686. The radially outer leg 684 is in the form of hook-shaped rolled tabs that sit in radially extending slots of the turbine-piston flange 38. The inner leg 686 includes flow restricting passages 688. A first frictional ring 648 is secured to a first side of the annular plate 682 facing the first engagement surface $24_1$, and a second frictional ring 649 is secured to an opposite second side of the annular plate 682 facing the turbine-piston flange 38. The passages 688 restrict the flow of fluid, e.g., hydraulic fluid, from the torus chamber 52 to outside the torus chamber 52, e.g., into the damper chamber 54 in the hydrokinetic torque coupling device 610, providing a smaller flow area than is otherwise provided by the annular space between the first engagement surface $24_1$ and the frictional ring 648 in the maximum axial displacement position shown in FIG. 8.

Figure 9A:
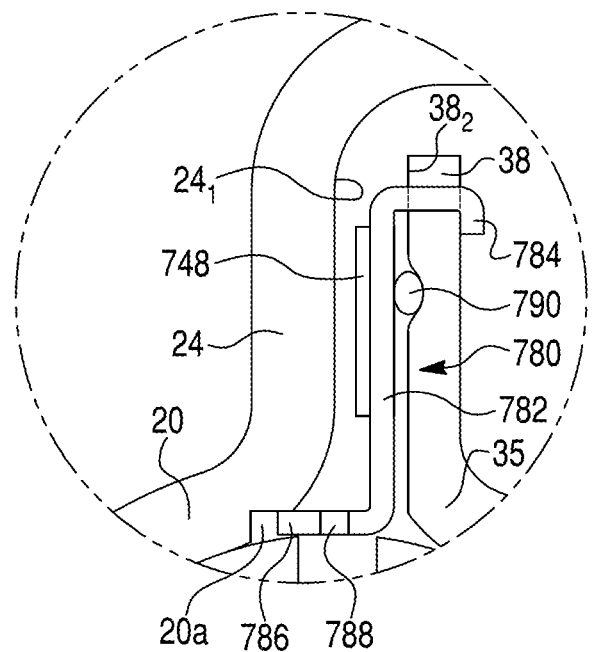
FIG. 9A is an enlarged fragmentary view of circle 9A of FIG. 9 in non-lockup mode.
Figure 9B:
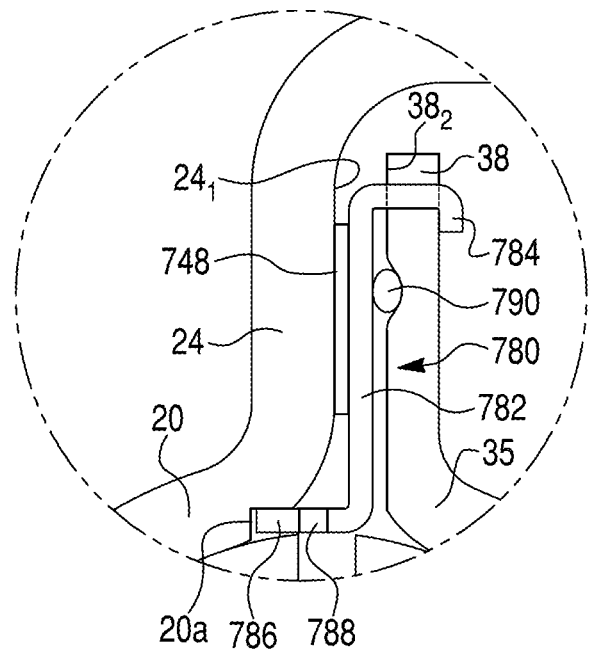
FIG. 9B is the same view of the eighth exemplary embodiment in lockup mode.

FIGS. 9, 9A, and 9B illustrate an eighth exemplary embodiment of a hydrokinetic torque coupling device 710 similar to device 510, with the following notable differences. The hydrokinetic torque coupling device 710 features a flow passage restrictor 780 in the form of an "S"-shaped annular plate 782 having a radially outer leg 784 and a radially inner leg 786. The radially outer leg 784 is in the form of hook-shaped rolled tabs that sit in radially extending slots of the turbine-piston flange 38. The inner leg 786 includes flow restricting passages 788. A frictional ring 748 is secured to a first side of the annular plate 782 facing the first engagement surface $24_1$, and a sealing member such as an O-ring 790 is secured between an opposite second side of the annular plate 782 to an annular groove in the turbine-piston flange 38. The passages 788 restrict the flow of fluid, e.g., hydraulic fluid, from the torus chamber 52 to outside the torus chamber 52, e.g., into the damper chamber 54 in the hydrokinetic torque coupling device 710, providing a smaller flow area than is otherwise provided by the annular space between the first engagement surface $24_1$ and the frictional ring 748 in the maximum axial displacement position shown in FIG. 9.

Figure 10:
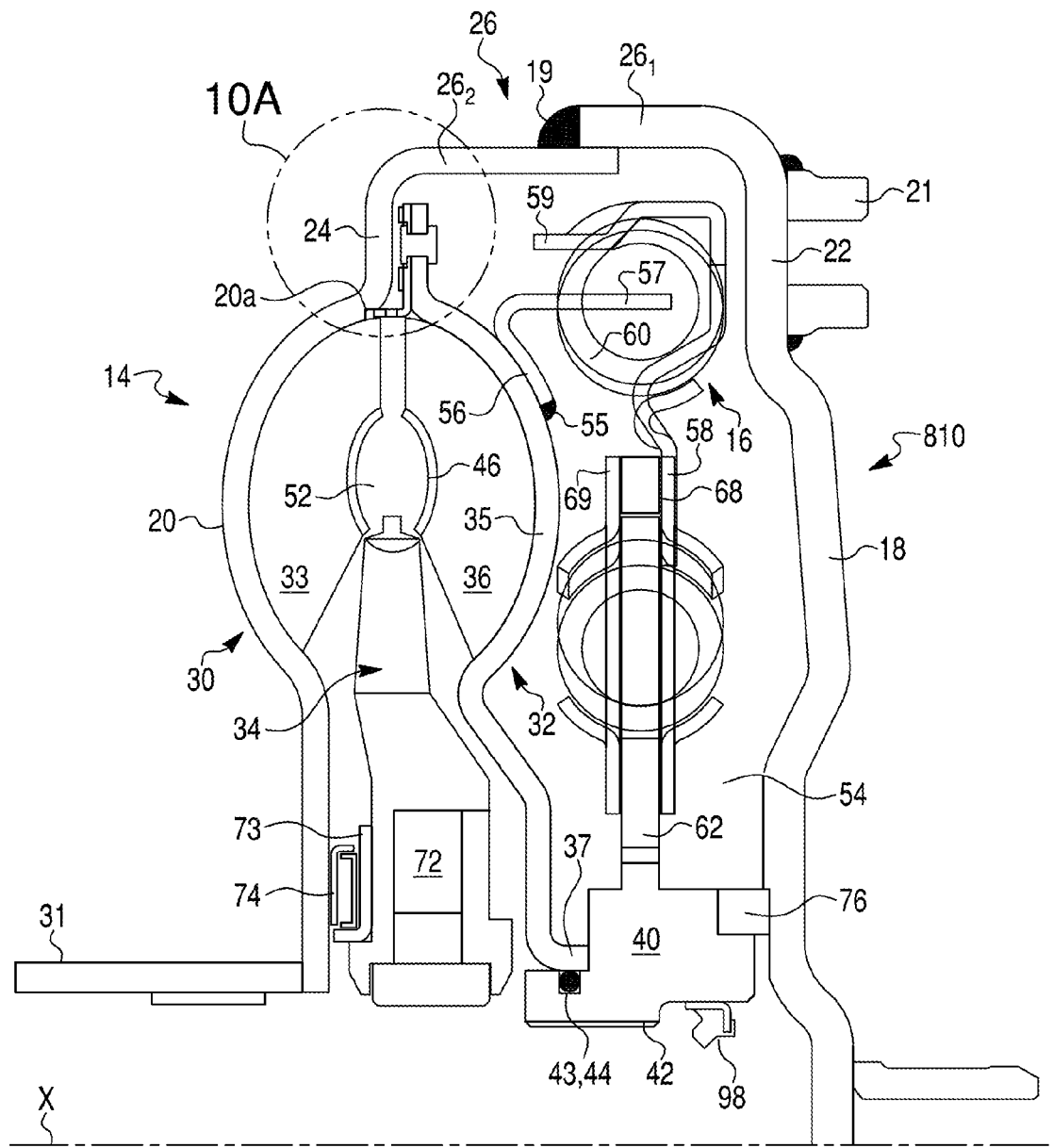
FIG. 10 is a fragmented half-view in axial cross section of a hydrokinetic torque coupling device equipped with a lockup clutch shown in a non-lockup mode in accordance with a ninth exemplary embodiment of the present invention.
Figure 10A:
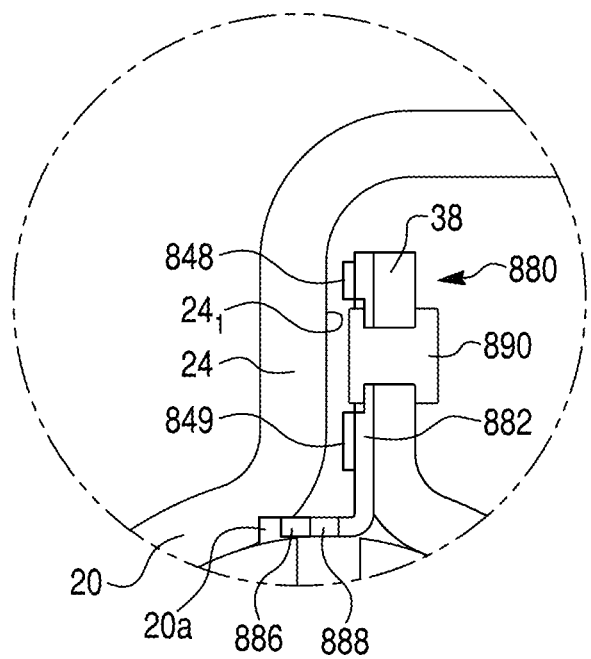
FIG. 10A is an enlarged fragmentary view of circle 10A of FIG. 10 in non-lockup mode.
Figure 10B:
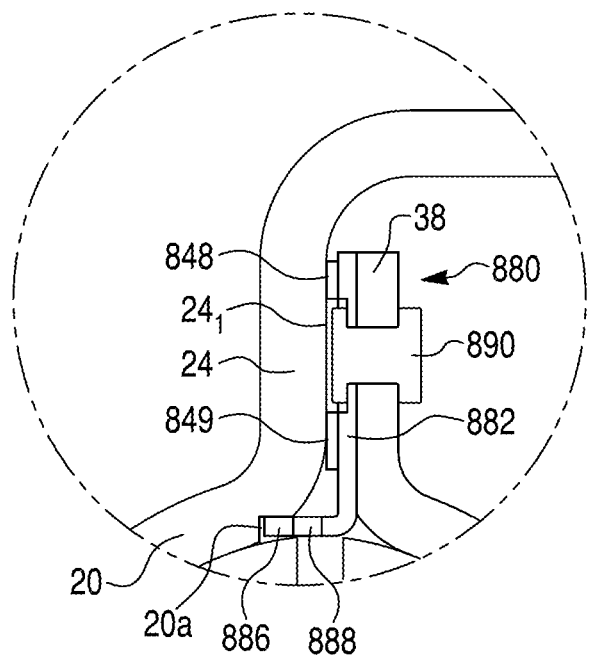
FIG. 10B is the same view of the ninth exemplary embodiment in lockup mode.
Figure 10C:
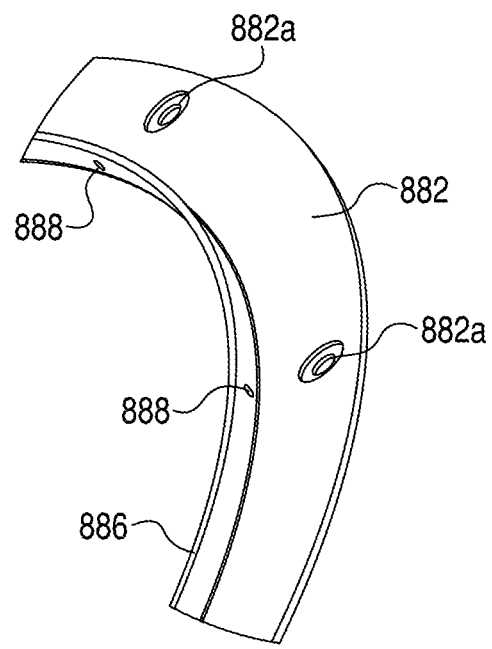
FIG. 10C is a perspective view of an annular restriction plate of the ninth exemplary embodiment.
Figure 10D:
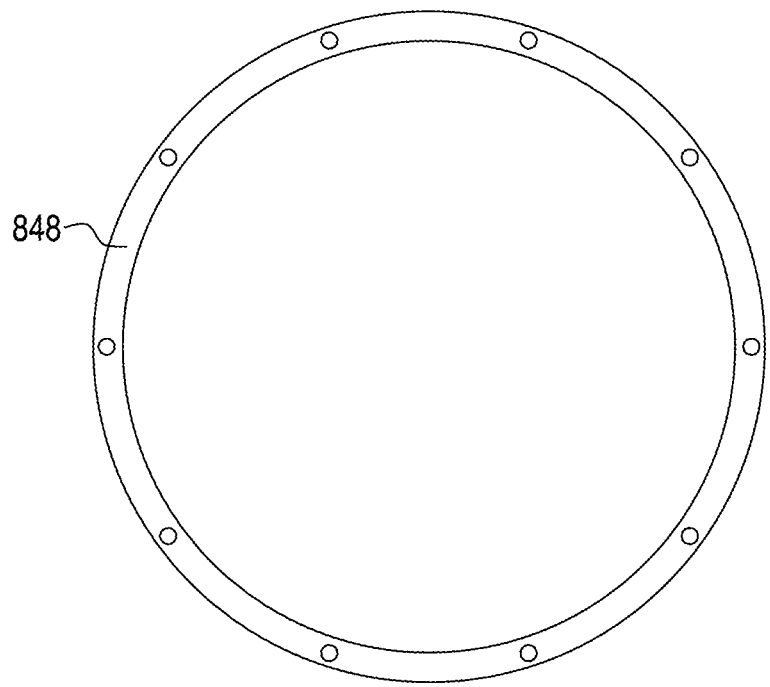
FIG. 10D is a front view of a friction facing lining of the ninth exemplary embodiment.

FIGS. 10 and 10A-10D illustrate a ninth exemplary embodiment of a hydrokinetic torque coupling device 810 similar to device 10, with the following notable differences. The hydrokinetic torque coupling device 810 features a flow passage restrictor 880 in the form of an L-shaped annular plate 882 having a radially inner leg 886 with flow restricting passages 888 circumferentially spaced from one another, as best shown in FIG. 10C. Rivets 890 circumferentially spaced about the annular plate 882 connect the annular plate 882 to the turbine-piston flange 38. Friction rings 848, 849 are secured on a surface of the annular plate 882 facing the first engagement surface $24_1$. The passages 888 restrict the flow of fluid, e.g., hydraulic fluid, from the torus chamber 52 to outside the torus chamber 52, e.g., into the damper chamber 54 in the hydrokinetic torque coupling device 810, providing a smaller flow area than is otherwise provided by the annular space between the first engagement surface $24_1$ and the frictional rings 848, 849 in the maximum axial displacement position shown in FIG. 10.

Other variations and modifications include modifying the damper assembly 16 to include only damping members 60 or damping members 64, or to include additional or no damping members. The features of the above-described embodiments may be practiced with one another and are substitutable in numerous combinations.

An exemplary method for assembling the hydrokinetic torque coupling device 10 according to the embodiment of FIGS. 1 and 2 will now be explained. It should be understood that this exemplary method may be practiced in connection with the other embodiments described herein. This exemplary method is not the exclusive method for assembling the hydrokinetic torque coupling devices described herein. While the methods for assembling the hydrokinetic torque coupling devices 10, 110, 210, 310, 410, 510, 610, 710, and 810 may be practiced by sequentially performing the steps as set forth below, it should be understood that the methods may involve performing the steps in different sequences.

The impeller 30, the turbine-piston 32, the stator 34, and the damper assembly 16 may each be separately preassembled. The turbine-piston 32 includes, as noted above, the turbine-piston shell 35, the turbine-piston core ring 46, and the turbine blades 36 extending between and attached to the turbine-piston shell 35 and the turbine-piston core 46. The radially outer first leg 84 of the restrictor 80 is press-fit into or otherwise secured to a machined recess of the turbine-piston flange 38. The second friction ring 49 may be secured to the body of the annular plate 82 either before or after press fitting. The impeller shell recess 20a is pre-milled into the surface of the impeller shell 20 so as to receive the radially inner second leg 86 and satisfy the C1>C relationship discussed above.

The impeller 30, the stator 34, and the turbine-piston 32 subassemblies are assembled together as shown in the drawings. The cylindrical flange 37 of the turbine-piston 32 is mounted to slidingly engage the output hub 40 (which is in turn splined with or mounted on the driven shaft) with the seal 44 therebetween. The damper assembly 16 is then added. The driving tabs 57 are engaged with the damper assembly 16 as described above. Then, the first casing shell 18 is sealingly secured, such as by welding at 19, to the second casing shell 20 so as that the shells 18, 20 are non-movable relative to one another, as best shown in FIG. 1.

Figure 11:
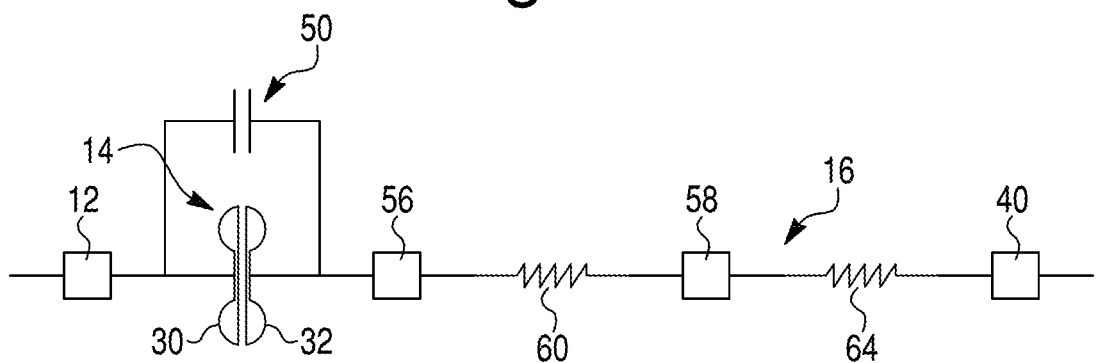
FIG. 11 is a simplified diagram of a hydrodynamic torque coupling device including a turbine-piston with a dual or double damper assembly.

The torque converters and hydrodynamic torque coupling devices described herein may incorporate different damper assemblies. For example, FIG. 11 shows a hydrodynamic torque coupling device including the impeller 30 and the turbine-piston 32 for establishing the hydrodynamic transmission mode and the lockup clutch 50 for lockup mode transmission. The impeller 30/turbine-piston 32 combination and the lockup clutch 50 are arranged parallel to one another and serially between the casing 12 and the turbine-piston shell 35. The elastic damping members 60 and 64 of the damper assembly 16 and the output hub 40 are arranged serially downstream of the turbine-piston shell 35 and the drive member 56 in FIG. 11. The diagram of FIG. 11 generally corresponds to the arrangement of the embodiments shown in FIGS. 1-10.

Figure 12:
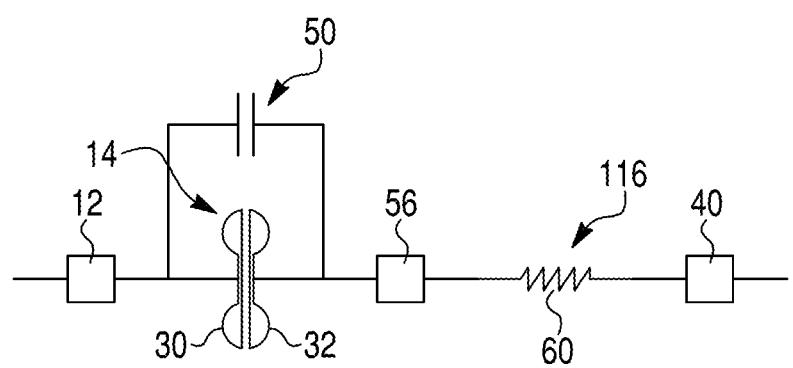
FIG. 12 is a simplified diagram of another hydrodynamic torque coupling device including a turbine-piston with a single damper assembly.

FIG. 12 shows an alternative damper assembly 116 similar to that of FIG. 1, but in which the damper assembly 116 is modified to include only one set of circumferentially extending elastic damping members 60.

Figure 13:
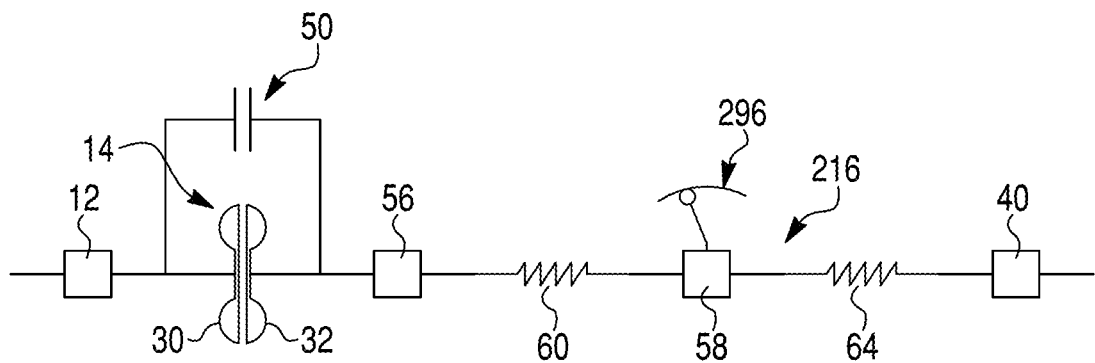
FIG. 13 is a simplified diagram of still another hydrodynamic torque coupling device including a turbine-piston with dual or double damper assemblies and a pendulum vibration absorber.

A damper assembly 216 shown in FIG. 13 is similar to that of FIG. 11, but further includes a centrifugal pendulum oscillator 296 coupled to the intermediate member 58. Centrifugal pendulum oscillators (or pendulum vibration absorbers) are well known in the art and described in, for example, U.S. patent application Ser. No. 14/305,128 filed Jun. 16, 2014, GB598811 to Stone, U.S. Pat. No. 6,026,940 to Sudau, and EP1744074 to Grahl. The centrifugal pendulum oscillator 296 may be coupled to the circumference of the intermediate member 58 and may be arranged on both sides of the intermediate member 58.

Figure 14:
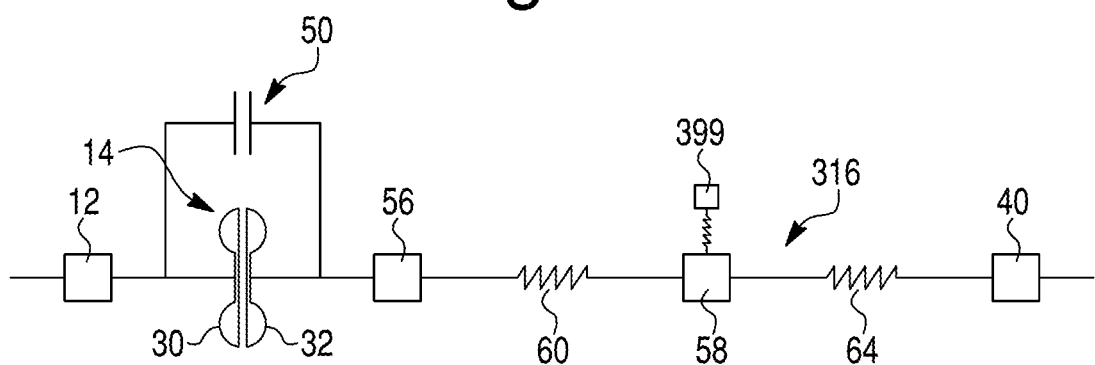
FIG. 14 is a simplified diagram of a further hydrodynamic torque coupling device including a turbine-piston with dual or double damper assemblies and a vibration absorbing spring-mass system.

A damper assembly 316 shown in FIG. 14 is similar to that of FIG. 11, but further includes a spring mass system 399 coupled to the intermediate member 58. Spring-mass systems are well known in the art and described in, for example, WO 2004/018897 to Haller. The spring-mass system 399 may be coupled to the circumference of the intermediate member 58. The spring of the spring-mass system 399 may be a coil spring, such as a steel spring. The damper may be any linear or non-linear damper, including for example a viscous damper. The spring and mass may be embodied as two components or one integral component. The spring-mass system may have a linear or non-linear constant or variable stiffness, and a constant or variable mass.

The features of the above-described embodiments are substitutable in numerous combinations.

The foregoing description of the exemplary embodiment(s) of the present invention has been presented for the purpose of illustration in accordance with the provisions of the Patent Statutes. It is not intended to be exhaustive or to limit the invention to the precise forms disclosed. The embodiments disclosed hereinabove were chosen in order to best illustrate the principles of the present invention and its practical application to thereby enable those of ordinary skill in the art to best utilize the invention in various embodiments and with various modifications as suited to the particular use contemplated, as long as the principles described herein are followed. This application is therefore intended to cover any variations, uses, or adaptations of the invention using its general principles. Further, this application is intended to cover such departures from the present disclosure as come within known or customary practice in the art to which this invention pertains. Thus, changes can be made in the above-described invention without departing from the intent and scope thereof. It is also intended that the scope of the present invention be defined by the claims appended thereto.

What is claimed is:

1. A torque converter rotatable about a rotational axis and having a torus chamber, comprising:
    an impeller coaxially aligned with the rotational axis and comprising an impeller shell and a plurality of impeller blades;
    a turbine-piston coaxially aligned with and hydrodynamically drivable by the impeller to rotate about the rotational axis, the turbine-piston comprising a turbine-piston shell and a plurality of turbine blades, the turbine-piston being axially displaceable relative to the impeller shell to position the torque converter into and out of a lockup mode in which the turbine-piston is mechanically locked to and non-rotatable relative to the impeller; and
    a restrictor positioned radially outward of the impeller blades and the turbine blades at an opening of a fluid passageway connecting the torus chamber to an environment outside the torque converter, the restrictor constructed and arranged to restrict the fluid passageway;
    the impeller shell having a first surface and the turbine-piston shell comprising a turbine-piston flange having a second surface facing the first surface and axially displaceable toward and away from the first surface to position the torque converter into and out of lockup mode;
    the restrictor comprising an annular restrictor plate extending radially outwardly between the first surface of the impeller shell and the second surface of the turbine-piston flange of the turbine-piston shell and having at least one passage restricting hydraulic fluid flow between the torus chamber and the environment outside the torque converter.

2. The torque converter of claim 1, wherein in the lockup mode the first and second surfaces frictionally engage one another and wherein out of the lockup mode the first and second surfaces are spaced from one another.

3. The torque converter of claim 2, wherein the first surface or the second surface comprises a frictional lining for establishing the frictional engagement in the lockup mode.

4. The torque converter of claim 1, wherein the at least one passage comprises a plurality of passages spaced from one another circumferentially about the annular restrictor plate.

5. The torque converter of claim 1, wherein the at least one passage comprises a plurality of passages uniformly spaced from one another circumferentially about the annular restrictor plate.

6. The torque converter of claim 1, wherein the annular restrictor plate comprises a radially outer leg press-fit to the turbine-piston flange, and a radially inner leg having the at least one passage, and wherein the radially inner second leg is located radially inside of the radially outer first leg.

7. The torque converter of claim 6, further comprising a frictional lining configured to provide frictional engagement in the lockup mode.

8. The torque converter of claim 6, wherein the radially inner leg is received in an impeller shell recess of the impeller shell in the lockup mode.

9. A torque converter rotatable about a rotational axis and having a torus chamber, comprising:
- an impeller coaxially aligned with the rotational axis and comprising an impeller shell and a plurality of impeller blades;
- a turbine-piston coaxially aligned with and hydrodynamically drivable by the impeller to rotate about the rotational axis, the turbine-piston comprising a turbine-piston shell and a plurality of turbine blades, the turbine-piston being axially displaceable relative to the impeller shell to position the torque converter into and out of lockup mode in which the turbine-piston is mechanically locked to and non-rotatable relative to the impeller; and
- a restrictor positioned radially outwardly of the impeller blades and the turbine blades at an opening of a fluid passageway connecting the torus chamber to an environment outside the torque converter, the restrictor configured to restrict the fluid passageway;
- the restrictor comprising an annular restrictor plate with at least one passage;
- the annular restrictor plate comprising a substantially flat ring having opposite edges, wherein in the lockup mode the opposite edges are received in an impeller shell recess of the impeller shell and a recess of the turbine-piston shell, respectively.

10. A torque converter rotatable about a rotational axis and having a torus chamber, comprising:
- an impeller coaxially aligned with the rotational axis and comprising an impeller shell and a plurality of impeller blades;
- a turbine-piston coaxially aligned with and hydrodynamically drivable by the impeller to rotate about the rotational axis, the turbine-piston comprising a turbine-piston shell and a plurality of turbine blades, the turbine-piston being axially displaceable relative to the impeller shell to position the torque converter into and out of a lockup mode in which the turbine-piston is mechanically locked to and non-rotatable relative to the impeller; and
- a restrictor positioned radially outward of the impeller blades and the turbine blades at an opening of a fluid passageway connecting the torus chamber to an environment outside the torque converter, the restrictor constructed and arranged to restrict the fluid passageway;
- the restrictor comprising an annular restrictor plate with at least one passage;
- the impeller shell having a first surface;
- the turbine-piston shell comprising a turbine-piston flange having a second surface facing the first surface and axially displaceable toward and away from the first surface to respectively position the torque converter into and out of the lockup mode;
- the annular restrictor plate being bonded or welded to the turbine-piston flange.

11. A torque converter rotatable about a rotational axis and having a torus chamber, comprising:
- an impeller coaxially aligned with the rotational axis and comprising an impeller shell and a plurality of impeller blades;
- a turbine-piston coaxially aligned with and hydrodynamically drivable by the impeller to rotate about the rotational axis, the turbine-piston comprising a turbine-piston shell and a plurality of turbine blades, the turbine-piston being axially displaceable relative to the impeller shell to position the torque converter into and out of a lockup mode in which the turbine-piston is mechanically locked to and non-rotatable relative to the impeller; and
- a restrictor positioned radially outward of the impeller blades and the turbine blades at an opening of a fluid passageway connecting the torus chamber to an environment outside the torque converter, the restrictor constructed and arranged to restrict the fluid passageway;
- the restrictor comprising an annular restrictor plate having a radially inner, axially extending leg without any passage or passages therethrough, the leg having an edge movable axially toward and away from a first edge of an impeller shell recess, the leg further having a radially outer surface facing and spaced from a second edge of the impeller shell recess to restrict the fluid passageway.

12. The torque converter of claim 11, wherein the impeller shell has a first surface, wherein the turbine-piston shell comprises a turbine-piston flange having a second surface facing the first surface and axially displaceable toward and away from the first surface to position the torque converter into and out of the lockup mode, and wherein the annular restrictor plate is welded to the turbine-piston flange.

13. A torque converter rotatable about a rotational axis and having a torus chamber, comprising:
- an impeller coaxially aligned with the rotational axis and comprising an impeller shell and a plurality of impeller blades;
- a turbine-piston coaxially aligned with and hydrodynamically drivable by the impeller to rotate about the rotational axis, the turbine-piston comprising a turbine-piston shell and a plurality of turbine blades, the turbine-piston being axially displaceable relative to the impeller shell to position the torque converter into and out of a lockup mode in which the turbine-piston is mechanically locked to and non-rotatable relative to the impeller; and
- a restrictor positioned radially outwardly of the impeller blades and the turbine blades at an opening of a fluid passageway connecting the torus chamber to an environment outside the torque converter, the restrictor configured to restrict the fluid passageway;
- the restrictor comprising an annular restrictor plate with at least one passage;
- the impeller shell having a first surface;
- the turbine-piston shell comprising a turbine-piston flange having a second surface facing the first surface and axially displaceable toward and away from the first surface to respectively position the torque converter into and out of the lockup mode;

the annular restrictor plate having a radially outer hook-shaped leg engaging the turbine-piston flange.

14. The torque converter of claim 13, further comprising a frictional lining secured to a surface of the annular restrictor plate facing the first surface.

15. The torque converter of claim 13, further comprising a first frictional lining secured to a first surface of the annular restrictor plate facing the first surface, and a second frictional lining secured to an opposite second surface of the annular restrictor plate facing the turbine-piston flange.

16. A torque converter rotatable about a rotational axis and having a torus chamber, comprising:
   an impeller coaxially aligned with the rotational axis and comprising an impeller shell and a plurality of impeller blades, the impeller shell having a first surface;
   a turbine-piston coaxially aligned with and hydrodynamically drivable by the impeller to rotate about the rotational axis, the turbine-piston comprising a turbine-piston shell and a plurality of turbine blades, the turbine-piston being axially displaceable relative to the impeller shell to position the torque converter into and out of lockup mode in which the turbine-piston is mechanically locked to and non-rotatable relative to the impeller;
   the turbine-piston shell comprising a turbine-piston flange having a second surface facing the first surface and axially displaceable toward and away from the first surface to position the torque converter into and out of the lockup mode;
   a restrictor positioned radially outward of the impeller blades and the turbine blades at an opening of a fluid passageway connecting the torus chamber to an environment outside the torque converter, the restrictor configured to restrict the fluid passageway, the restrictor comprising an annular restrictor plate with at least one passage; and
   rivets securing the annular restrictor plate to the turbine-piston flange.

17. A hydrokinetic torque coupling device for coupling together a driving shaft and a driven shaft, the hydrokinetic torque coupling device rotatable about a rotational axis and comprising:
   a casing comprising an impeller shell and a casing shell interconnected to and non-rotatable relative to the impeller shell, the casing being rotatable about the rotational axis and having a damper chamber;
   torque converter coaxially aligned with and rotatable about the rotational axis, the torque converter having a torus chamber and comprising
      an impeller comprising the impeller shell and a plurality of impeller blades;
      a turbine-piston hydrodynamically drivable by the impeller and comprising a turbine-piston shell, a plurality of turbine blades, and a drive component, the turbine-piston being axially displaceable relative to the impeller shell to position the torque converter into and out of a lockup mode in which the turbine-piston is mechanically locked to and non-rotatable relative to the casing; and
      a restrictor positioned radially outward of the impeller blades and the turbine blades at an opening of a fluid passageway connecting the torus chamber and the damper chamber, the restrictor constructed and arranged to restrict the fluid passageway; and
   a damper assembly located in the damper chamber and comprising an input part operatively connected to the drive component of the turbine-piston and an output part operatively connectable to an output hub;
   the impeller shell having a first surface and the turbine-piston shell comprising a turbine-piston flange having a second surface facing the first surface and axially displaceable toward and away from the first surface to position the torque converter into and out of the lockup mode;
   the restrictor comprising an annular restrictor plate extending radially outwardly between the first surface of the impeller shell and the second surface of the turbine-piston flange of the turbine-piston shell and having at least one passage restricting hydraulic fluid flow between the torus chamber and the environment outside the torque converter.

18. The hydrokinetic torque coupling device of claim 17, further comprising a drive member interconnecting the turbine-piston shell to the damper assembly, wherein the damper assembly comprises an intermediate member, a first set of circumferentially extending elastic damping members drivingly coupling the drive member to the intermediate member, a driven member connected to and non-rotatable relative to the output hub, a second set of circumferentially extending elastic damping members drivingly coupling the intermediate member to the driven member, and a centrifugal pendulum oscillator mounted to the intermediate member.

19. The hydrokinetic torque coupling device of claim 17, further comprising a drive member interconnecting the turbine-piston shell to the damper assembly, wherein the damper assembly comprises an intermediate member, a first set of circumferentially extending elastic damping members drivingly coupling the drive member to the intermediate member, a driven member connected to and non-rotatable relative to the output hub, a second set of circumferentially extending elastic damping members drivingly coupling the intermediate member to the driven member, and a spring mass system coupled to the intermediate member.

20. The hydrokinetic torque coupling device of claim 17, further comprising a stator situated between the impeller and the turbine-piston.

21. A method of assembling a hydrokinetic torque coupling device for coupling a driving shaft and a driven shaft together, comprising:
   providing a torque converter rotatable about a rotational axis and having a torus chamber, the torque converter comprising
      an impeller comprising an impeller shell and a plurality of impeller blades;
      a turbine-piston hydrodynamically drivable by the impeller and comprising a turbine-piston shell, a plurality of turbine blades, and a drive component; and
      a restrictor positioned radially outward of the impeller blades and the turbine blades at an opening of a fluid passageway connecting the torus chamber and a damper chamber, the restrictor constructed and arranged to restrict the fluid passageway;
   the impeller shell having a first surface and the turbine-piston shell comprising a turbine-piston flange having a second surface facing the first surface and axially displaceable toward and away from the first surface to position the torque converter into and out of the lockup mode;
   the restrictor comprising an annular restrictor plate extending radially outwardly between the first surface of the impeller shell and the second surface of the turbine-piston flange of the turbine-piston shell and having at least one passage restricting hydraulic fluid flow between the torus chamber and the environment outside the torque converter;

operatively connecting the torque converter to a damper assembly so that an input part of the damper assembly is connected to the drive component of the turbine-piston; and operatively connecting a casing shell to the impeller shell of the torque converter to form a casing that is rotatable about the rotational axis and has a damper chamber in which the damper assembly is located, the turbine-piston being axially displaceable relative to the impeller shell to position the torque converter into and out of a lockup mode in which the turbine-piston is mechanically locked to and non-rotatable relative to the casing.

* * * * *